United States Patent
Torres et al.

(10) Patent No.: US 10,594,616 B2
(45) Date of Patent: Mar. 17, 2020

(54) DATA BUFFERING CONTROL SYSTEM AND METHOD FOR A COMMUNICATION NETWORK

(71) Applicant: Hughes Network Systems LLC, Germantown, MD (US)

(72) Inventors: Robert James Torres, New Market, MD (US); Nagesh Javali, Germantown, MD (US); Venkat Ganesan, Germantown, MD (US)

(73) Assignee: HUGHES NETWORK SYSTEMS, LLC., Germantown, MD (US)

( * ) Notice: Subject to any disclaimer, the term of this patent is extended or adjusted under 35 U.S.C. 154(b) by 176 days.

(21) Appl. No.: 15/281,680

(22) Filed: Sep. 30, 2016

(65) Prior Publication Data

US 2018/0097738 A1  Apr. 5, 2018

(51) Int. Cl.
*H04L 12/835* (2013.01)
*H04B 7/185* (2006.01)
*H04L 12/825* (2013.01)

(52) U.S. Cl.
CPC ......... *H04L 47/30* (2013.01); *H04B 7/18513* (2013.01); *H04L 47/25* (2013.01)

(58) Field of Classification Search
CPC ............ H04B 7/18582; H04L 12/2854; H04L 12/4604
See application file for complete search history.

(56) References Cited

U.S. PATENT DOCUMENTS

| 6,549,587 | B1 * | 4/2003 | Li | H04B 3/23 375/324 |
| 6,636,529 | B1 * | 10/2003 | Goodman | H04J 3/1617 370/466 |
| 7,356,605 | B1 | 4/2008 | Khouri et al. | |
| 2002/0016851 | A1 * | 2/2002 | Border | H04B 7/18582 709/234 |
| 2003/0112796 | A1 * | 6/2003 | Kwan | G10L 25/90 370/352 |

(Continued)

OTHER PUBLICATIONS

International Search Report and Written Opinion dated Dec. 11, 2017 in corresponding International Application No. PCT/US17/53398, filed Sep. 26, 2017.

*Primary Examiner* — Khaled M Kassim
*Assistant Examiner* — Syed Ali
(74) *Attorney, Agent, or Firm* — Global IP Counselors, LLP

(57) ABSTRACT

A data buffering control system and method for a communication network comprises a buffer disposed at a destination site, and a controller. The buffer is configured to buffer data received at a data receiving rate by the destination site for delivery by the destination site to a user at a delivery flow rate. The controller is configured to increase or decrease a buffering rate according to which the data is buffered in the buffer based on an amount of buffered data in the buffer without stopping the buffering of the data in the buffer. The controller is configured to perform a transmission control protocol spoofing process at the destination site to effect a communication handshaking operation, without the destination site communicating with a source providing the data, to control the data receiving rate by the destination site, to thus modify the buffering rate.

11 Claims, 17 Drawing Sheets

(56) References Cited

U.S. PATENT DOCUMENTS

| | | | |
|---|---|---|---|
| 2004/0236966 A1* | 11/2004 | D'Souza | H04L 29/06 |
| | | | 726/13 |
| 2010/0182947 A1 | 7/2010 | Jong et al. | |
| 2010/0220856 A1* | 9/2010 | Kruys | H04L 9/0833 |
| | | | 380/44 |
| 2012/0243410 A1* | 9/2012 | Vedula | H04L 41/5025 |
| | | | 370/235 |
| 2015/0032899 A1 | 1/2015 | Willars et al. | |
| 2015/0067137 A1* | 3/2015 | VerSteeg | H04L 47/25 |
| | | | 709/224 |
| 2015/0172314 A1* | 6/2015 | Mononen | H04L 63/1416 |
| | | | 726/8 |
| 2015/0381752 A1* | 12/2015 | Torres | H04L 67/28 |
| | | | 709/228 |

* cited by examiner

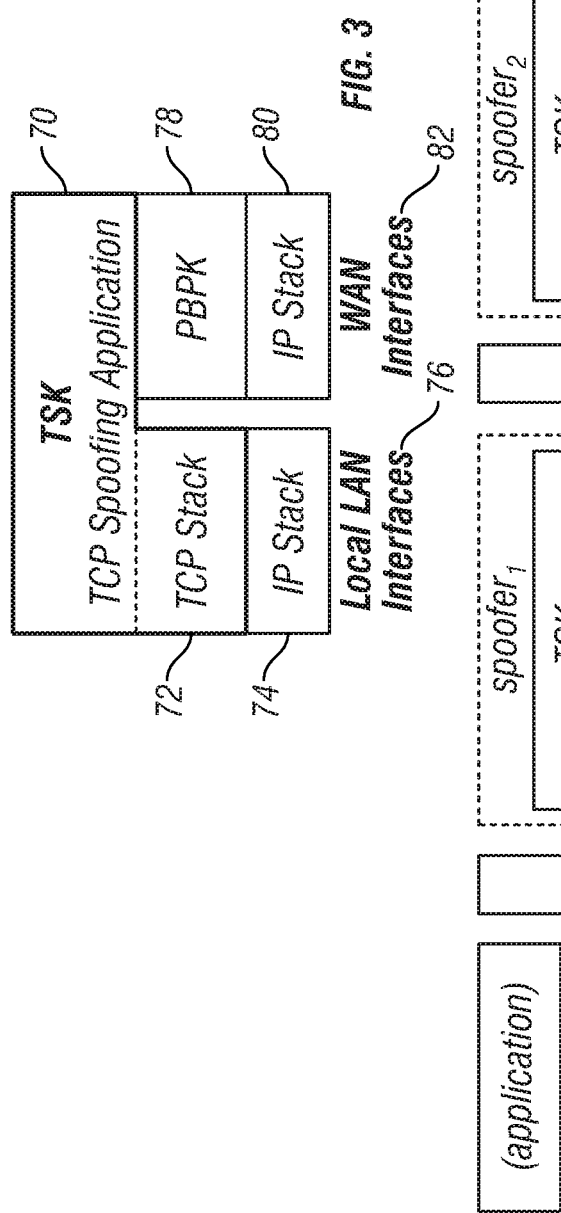
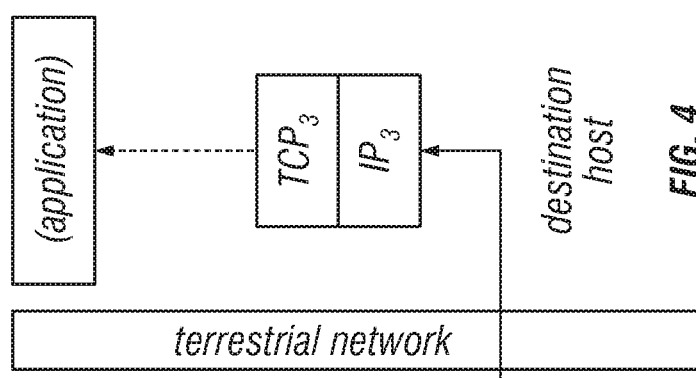
FIG. 3
FIG. 4

DATA BUFFERING CONTROL SYSTEM AND METHOD FOR A COMMUNICATION NETWORK

BACKGROUND

Field of the Invention

The present invention generally relates to a data buffering control system and method for a communication network and, in particular, for a satellite-based communication network. More specifically, the present invention relates to a data buffering control system and method for a satellite-based communication network that controls a buffering rate according to which data received by a destination site, such as an end-user terminal or an end-user device, is buffered in a buffer at the destination site based on an amount of buffered data in the buffer without stopping the buffering of the data in the buffer.

Background Information

In communication networks, such as satellite-based communication networks, endpoint delay or latency is an ongoing concern. For example, in a residential setting, several users are often accessing content at the same time via the wireless local area network (WLAN) at the residence. One user may be attempting to stream a video, while another user is merely browsing content, and still another is simply accessing emails. Thus, users are attempting to access content at different rates. Also, because the users may be at different areas of the residence, the respective quality of each of their respective connection (also referred to as "flow") with the wireless access point (WAP) is often different. One user who is, for example, on an outside deck at the residence will often experience a lower quality connection with the WAP than a user in a room proximate to the WAP. Thus, the different users may experience different performance which may adversely affect content delivery to some or all of the users.

As understood in the art, various types of proxy mechanisms have been developed in an attempt to enhance endpoint performance. Examples of these proxy mechanisms include split transport proxy, such as performance enhancing proxy (PEP) and transmission control protocol (TCP) spoofing, and proxy servers, such as web proxy servers, that may need to buffer web content. Other known types of proxy mechanisms include a split architecture web proxy mechanism, such as Amazon Silk, and web acceleration servers that perform caching and prefetching to improve web response time.

These various types of proxy mechanisms also are capable of performing content monitoring and filtering, filtering of encrypted data, bypassing of filters and other censorships, logging and eavesdropping for security, performance improvement, anonymous access to services, access control, and so on as understood in the art. Typically, these proxy mechanisms buffer packets at various endpoints of a proxy server. For example, a web proxy server may buffer packets only at the web proxy server, while a split transport proxy buffers packets at a remote proxy end-point and at local proxy end-point.

SUMMARY

Although the known types of proxy mechanisms discussed above may be beneficial in improving endpoint performance in certain scenarios, proxy mechanisms often create other issues relating, in particular, to buffer usage at the proxy server. For example, limited memory on an end-user device, such as a Smart TV, can cause frequent closing of the TCP receive window. Hence, the use of, for example, a Netflix App on a Smart TV with limited memory may result in frequent closing of the TCP receive window. Also, an application such as a Podcast player with limited buffer space typically consumes and receives packets slowly. In addition, a poor Wi-Fi connection, such as a connection (flow) with low link speed, high packet loss, high round-trip time (RTT) and so on, can cause packets to be drained slowly, even though application on a user device can consume the packets at a faster rate. For purposes of the description herein, the terms "connection" and "flow," and their plurals, are used interchangeably.

Because a proxy server contains a finite memory, the types of scenarios discussed above can result in a decrease in the number of simultaneous connections and flows that can be supported, especially since some applications consume excessive memory. Furthermore, the maximum throughput that can be achieved through the proxy server can decrease because some connections will monopolize the memory of the proxy server.

In order to address these issues, the disclosed embodiments provide a system and method which operate to dynamically limiting per flow buffer allocation based on connection/flow service rate, which can also be commonly referred to as the drain rate. In particular, the system and method employ a controller which dynamically and continuously computes the maximum memory use (e.g., buffer use) allowed for each flow based on the flow service rate, which can also be referred to as the drain rate or throughput. That is, the controller calculates the minimum threshold and maximum threshold of memory usage for each flow based on the flow service rate. When the controller determines that the memory usage exceeds the maximum threshold allowed for the flow, the controller controls the proxy server to stop accepting packets on this flow from the remote end-point or the actual server. Similarly, when the controller determines that the memory usage falls below the minimum threshold allowed, the controller controls the proxy server to start accepting packets for this flow from the remote end-point or the actual server. The proxy server may use the proprietary flow control mechanisms or standard TCP flow control mechanisms to control when packets can be accepted for a particular flow.

Accordingly, exemplary embodiments of the present invention provide a data buffering control system and method for a communication network that employ a buffer disposed at a destination site and a controller. The buffer is configured to buffer data received at a data receiving rate by the destination site for delivery by the destination site to a user at a delivery flow rate. The controller is configured to increase or decrease a buffering rate according to which the data is buffered in the buffer based on an amount of buffered data in the buffer without stopping the buffering of the data in the buffer. The controller is configured to perform a transmission control protocol spoofing process at the destination site to effect a communication handshaking operation, without the destination site communicating with a source providing the data, to control the data receiving rate by the destination site, to thus modify the buffering rate.

BRIEF DESCRIPTION OF THE DRAWINGS

Referring now to the attached drawings which form a part of this original disclosure:

FIG. 3 is a conceptual block diagram that conceptually illustrates an exemplary relationship between a TCP spoofing kernel and stacks according to a disclosed embodiment;

FIG. 4 is a diagrammatic view showing an example of the relationship of elements for spoofing as performed in the satellite communication network shown in FIGS. 1 and 2;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
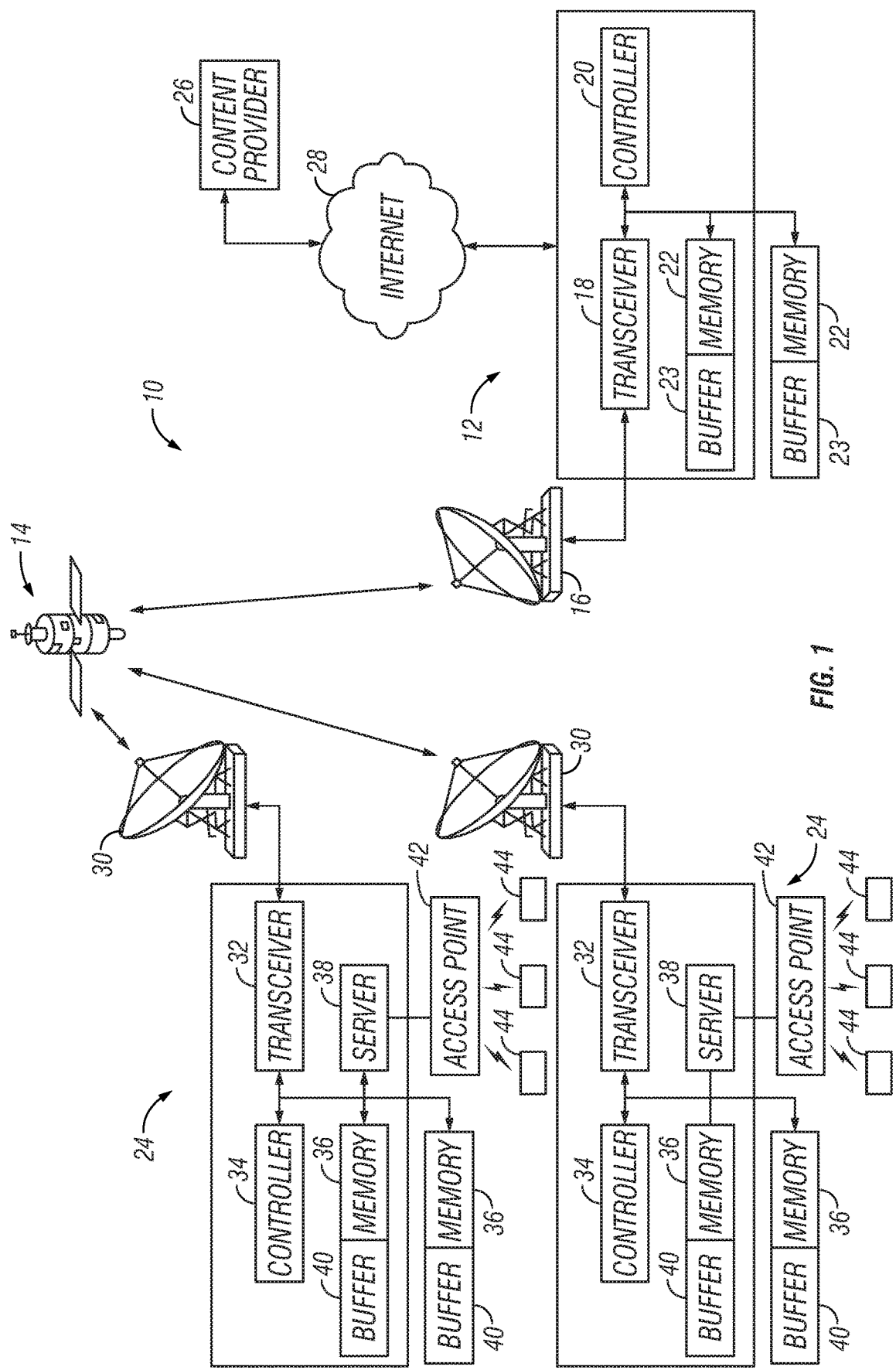
FIG. 1 illustrates an example of a satellite communication network according to a disclosed embodiment.

FIG. 1 illustrates an example of a satellite communication network 10 according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. Also, the memory 22 can include at least one buffer 23 which is configured to buffer, for example, packets to be sent by the gateway 12 as discussed in more detail herein.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellite 14 and terminals 24 typically communicate with each other over a radio frequency link, such as a Ku-band link, a Ka-band link or any other suitable type of link as understood in the art, which can generally be referred to as a space link. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a terminal 24 typically includes an antenna dish 30, a transceiver 32, a controller 34, a memory 36, a local server 38 and other types of equipment (not shown) such as amplifiers, waveguides and so on as understood in the art on which enable communication between the terminal 24 and one or more gateways 12 via one or more of the orbiting satellites 14. A transceiver 32 can include, for example, an integrated satellite modem and any other suitable equipment which enables the transceiver 32 to communicate with one or more of the orbiting satellites 14 as understood in the art. The memory 36 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the memory 36 can include at least one buffer 40 which is configured to buffer, for example, received packets as discussed in more detail herein. Also, the local server 38 can communicate with an access point 42, such as a WAP or any other suitable device, which enables the local server 38 to provide packets to end user devices 42 as discussed herein. Such end user devices 44 include, for example, desktop computers, laptop or notebook computers, tablets (e.g., iPads), smart phones, Smart TVs and any other suitable devices as understood in the art. Naturally, the communications between the local server 38, the access point 42 and the end user devices 44 can occur over wireless connections, such as WiFi connections, as well as wired connections as understood in the art.

As with the controller 20 for a gateway 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the present invention.

Figure 2:
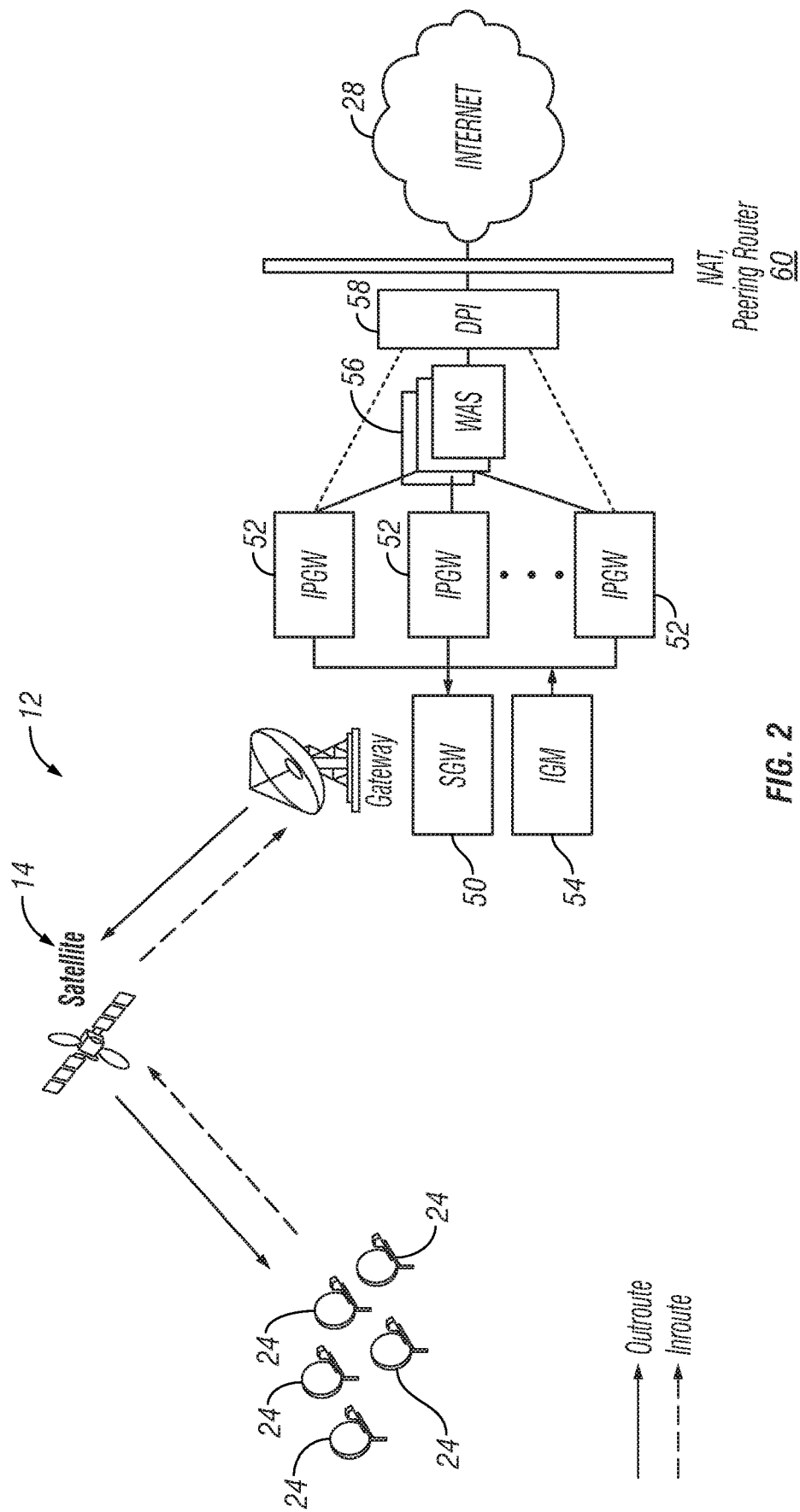
FIG. 2 illustrates further details of the satellite communication network 10 as shown in FIG. 1.

FIG. 2 illustrates further details of the satellite communication network 10 as shown in FIG. 1 and, in particular, further details pertaining to a terrestrially mounted gateway 12 for communicating in the satellite communication network 10. These components of the gateway 12 as shown in FIG. 2 can be carried out by the controller 20 or controllers 20 and their related hardware and software associated with the gateway 12 as can be appreciated by one skilled in the art. For example, the gateway 12 includes at least one Satellite GateWay (SGW) 50, at least one Internet Protocol GateWay (IPGW) 52, and at least one Inroute Group Manager (IGM) 54, and can include at least one Web Acceleration Server (WAS) 56, at least one Deep Packet Inspector (DPI) 58, and at least one Network Address Translation (NAT) peering router 60. As understood in the art, a gateway 12 does not need to include a WAS 56, DPI 58 and/or an NAT peering router 60. As further understood in the art, the SGW 50 estimates transport bandwidth based on, for example, modulation and coding (MODCOD) and symbol rate of the packets being transmitted by the gateway 12 and of the packets being received by the gateway 12. The IGPWs 52 determine traffic demands for each of the terminals 24 and request bandwidth from the SGW 50, and the SGW 50 performs dynamic bandwidth allocations to the IPGWs 52. The IGM 54 performs inroute bandwidth allocations and load balancing, and the IPGWs 52 schedule packets for all of the terminals 24 requesting packets, depending on the bandwidth allocations established by the IGM 54. The web accelerator server 56, the deep packet inspector (DPI) 58, and the network address translation (NAT) peering router 60 provide communication between the IPGWs 52 and the Internet 28, to enable the IPGWs 52 to retrieve packets from the Internet 28 and send packets to the Internet 28 in any suitable manner as understood in the art.

As can further be appreciated from FIGS. 1 and 2, each terminal 24 requesting packets performs inroute bandwidth requests, link layer queue servicing, and flow control. The controller 34 or controllers 34 and their related hardware and software associated with the terminal 24 can perform these inroute bandwidth requests, link layer queue servicing and flow control as can be appreciated by one skilled in the art. Also, the flow control can be performed, for example, by layer 2 or layer 3 switching, or in any other suitable manner as understood in the art.

The following is a discussion of an exemplary TCP spoofing process that is performed in the satellite communication network 10 as shown in FIGS. 1 and 2. FIG. 3 is a conceptual block diagram that conceptually illustrates an exemplary relationship between a TCP spoofing kernel (TSK) 70, a TCP stack 72 and an IP stack 74 at local LAN interfaces 76, which can be present at any of the terminals 24. FIG. 3 further conceptually illustrates an exemplary relationship between the TSK 70, a performance enhancing proxy backbone protocol kernel (PBPK) 78, and an IP stack 80 at WAN interfaces 82, which can also be present at any of the terminals 24. As can be appreciated from the following description, all of the features shown in FIG. 3 can be embodied by the controller 34 and related hardware and software at the terminals 24, in cooperation with the controller 20 and related hardware and software at the gateway 12.

In this example, the TSK 70 is responsible for all of the functions related to TCP spoofing. The TSK 70 in this example logically comprises two basic parts, namely, a TCP stack and a TCP spoofing application. The TCP stack in this example is responsible for interacting with the TCP stacks of IP hosts connected to a local LAN interface or local LAN interfaces of a performance enhancement proxy (PEP) end point, such as a PEP at a terminal 24. The two PEP end points have spoofing enabled in order to carry a spoofed TCP connection. The TSK 70 includes the TCP protocol including the appropriate TCP state machines and terminates spoofed TCP connections. As can be appreciated from the conceptual diagram of FIG. 3, the TCP spoofing application, as effected by the TSK 70, sits on top of the TCP stack, and acts as the application receiving data from and sending data to the IP host applications. The TCP spoofing application hides the details of TCP spoofing from the TCP stack as much as possible, thereby allowing the TCP stack to function as much like a standard TCP stack as possible. The TCP spoofing application is further responsible for interfacing to the PBPK 78.

In this example, the TCP spoofing splits the end-to-end TCP connection, resulting in three tandem connections between the end hosts, such as a terminal 24 and the gateway 12. In this "split TCP" scheme, each host uses whatever version of TCP present at the host. The TCP connection from a source host extends to an associated PEP end point, and is terminated at that PEP end point. The TCP data from that flow is sent by the PEP end point to a peer PEP end point using a reliable protocol. Appropriate information describing the TCP connection is also sent so that the peer PEP end point can use TCP to transport the data to the ultimate destination host as intended by the source. Thus, a TCP connection is split into two terrestrial TCP connections joined by a third connection over the space link between the gateway 12, the satellite 14 and the terminal 24. An additional benefit to this configuration is that the protocol operating over the space link does not operate outside of the satellite communication network 10, and thus may be tailored specifically for the satellite communication network 10, thereby allowing performance optimization and more efficient uplink capacity utilization. Also, since spoofing helps reduce capacity usage, primarily by a reduction of the number of acknowledgment packets, spoofing can be enabled by default in the satellite communication network 10.

As discussed in more detail below, during communication between a gateway 12 and a terminal 24, PEP backbone connections are established between two PEP end points to support carrying spoofed data between them. Each backbone connection has an associated priority and supports multiple spoofed TCP connections of the same traffic class. The classification rule identifies the mapping between a spoofed TCP connection and a PEP backbone. Also, besides carrying all spoofer messages, all spoofed TCP connections of the same traffic class between the respective PEP end points can be multiplexed over a common backbone connection. This backbone connection can be pre-established and is permanently available, which allows for a spoofing TCP 3-way handshake, and greatly reduces the time to establish a TCP connection. The PEP backbone protocol (PBP) is used in this example to reliably communicate over the backbone connection.

Figure 5:
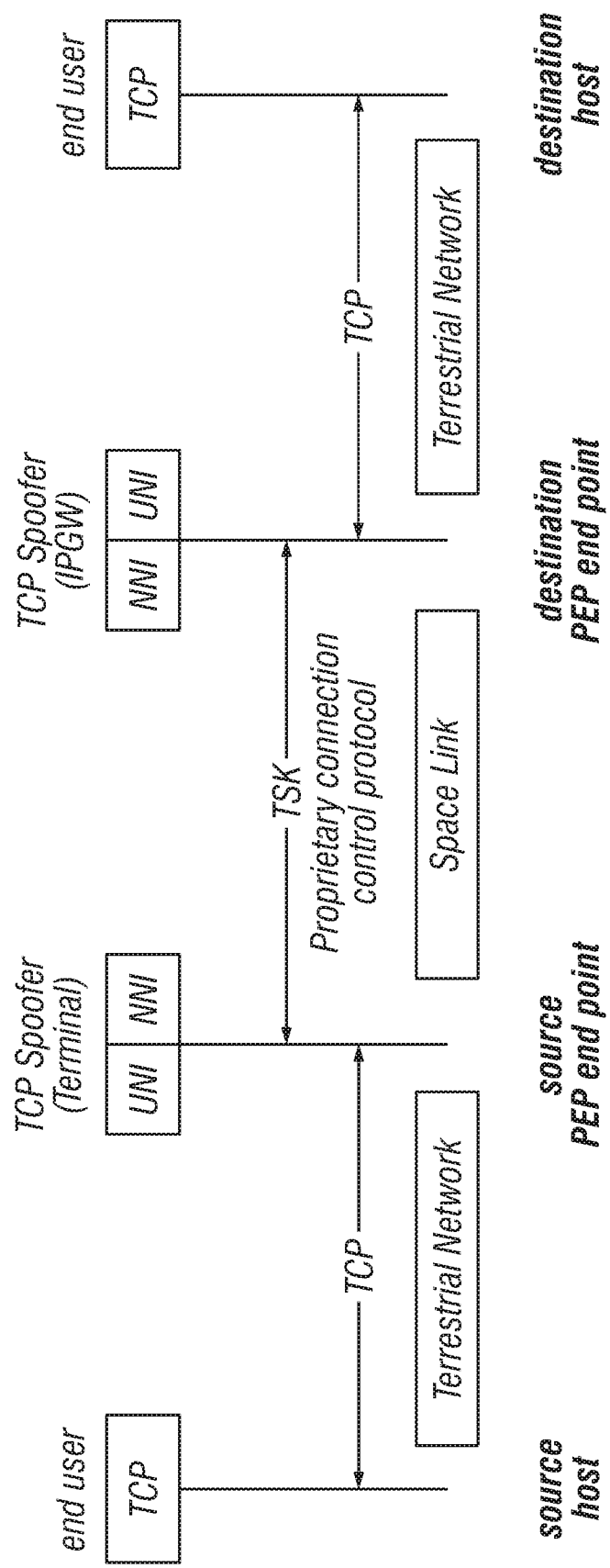
FIG. 5 is another diagrammatic view showing an example of the relationship of elements for spoofing as performed in the satellite communication network shown in FIGS. 1 and 2.

FIGS. 4 and 5 are diagrammatic views showing an example of the relationship of elements for spoofing as performed in the satellite communication network 10. The arrows shown in FIG. 4 provide an example of the path traveled by data from one network layer or entity to another through spoofing. In this example, a TCP spoofer is logically partitioned as User-network interface (UNI) and Network-network interface (NNI) components. As understood in the art, UNI has the TCP implementation, while NNI has the proprietary connection control protocol. UNI interacts with the end hosts on the terrestrial side, and is the TCP part of the spoofer. NNI is the proprietary connection control protocol, and is the TSK part of the spoofer. The NNI part (TSK) is not visible to the end hosts and exists between two PEP end points, such as an IPGW 52 of the gateway 12 and a terminal 24.

As can be appreciated from FIGS. 4 and 5, the spoofer accepts incoming TCP/IP datagrams, and "spoofs" the source TCP by sending TCP acknowledgments to the source even though the data that is being acknowledged has not yet actually been delivered to the ultimate destination. The spoofer conceptually comprises a TCP implementation that communicates with a terrestrially connected end host, and a TSK 52 which manages communication between that TCP implementation and its TSK peer using the reliable PEP backbone Protocol. In this configuration, the spoofer resides at the PEP end point, and backbone connections extend between PEP end points. The TSK is flexible in enabling or disabling the spoofing of the three-way handshake. By default, three-way handshakes are always spoofed.

Figure 6:
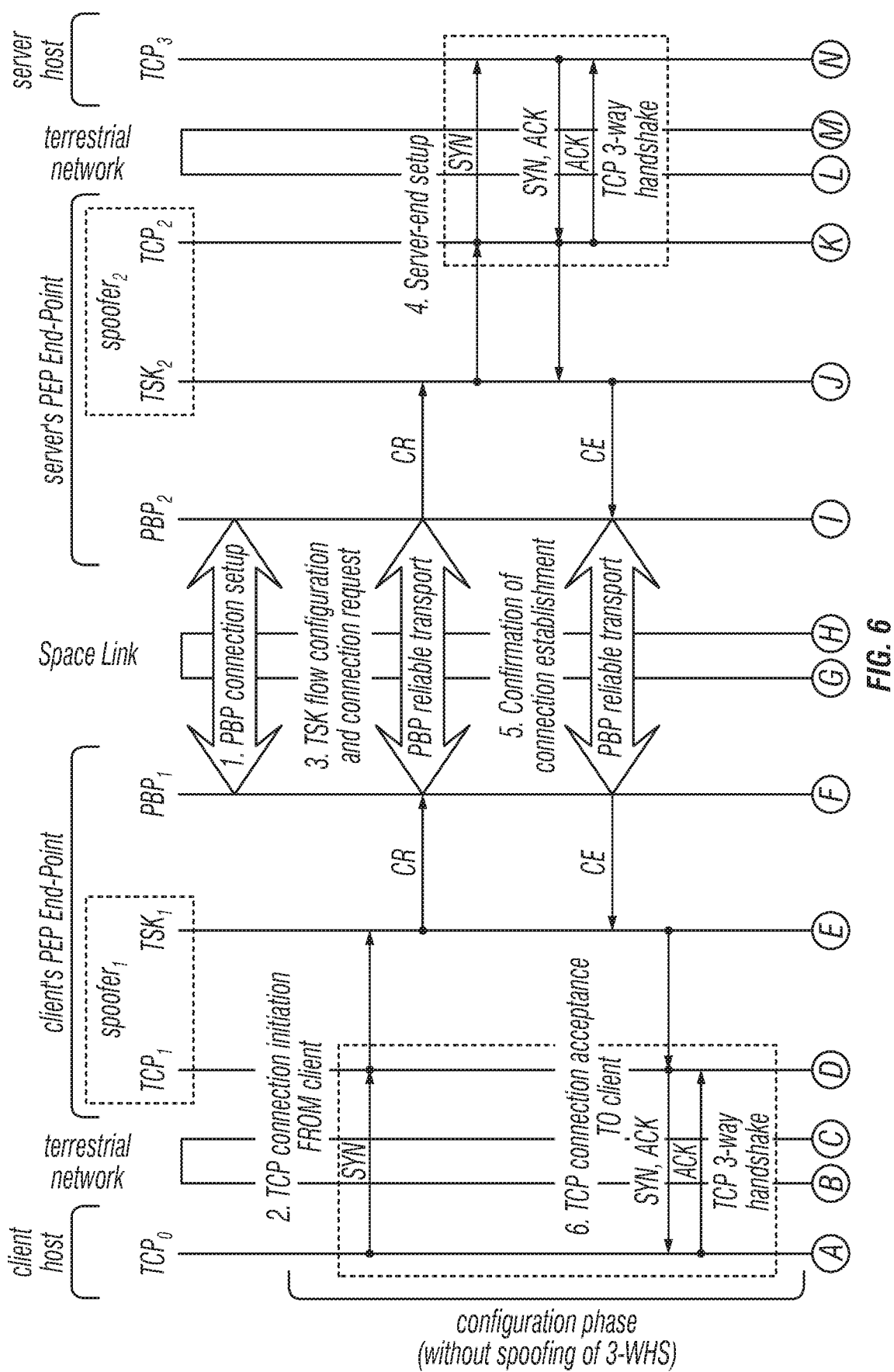
FIG. 6 diagrammatically illustrates an example of an operating scenario in which three-way handshakes are not spoofed.
Figure 6:
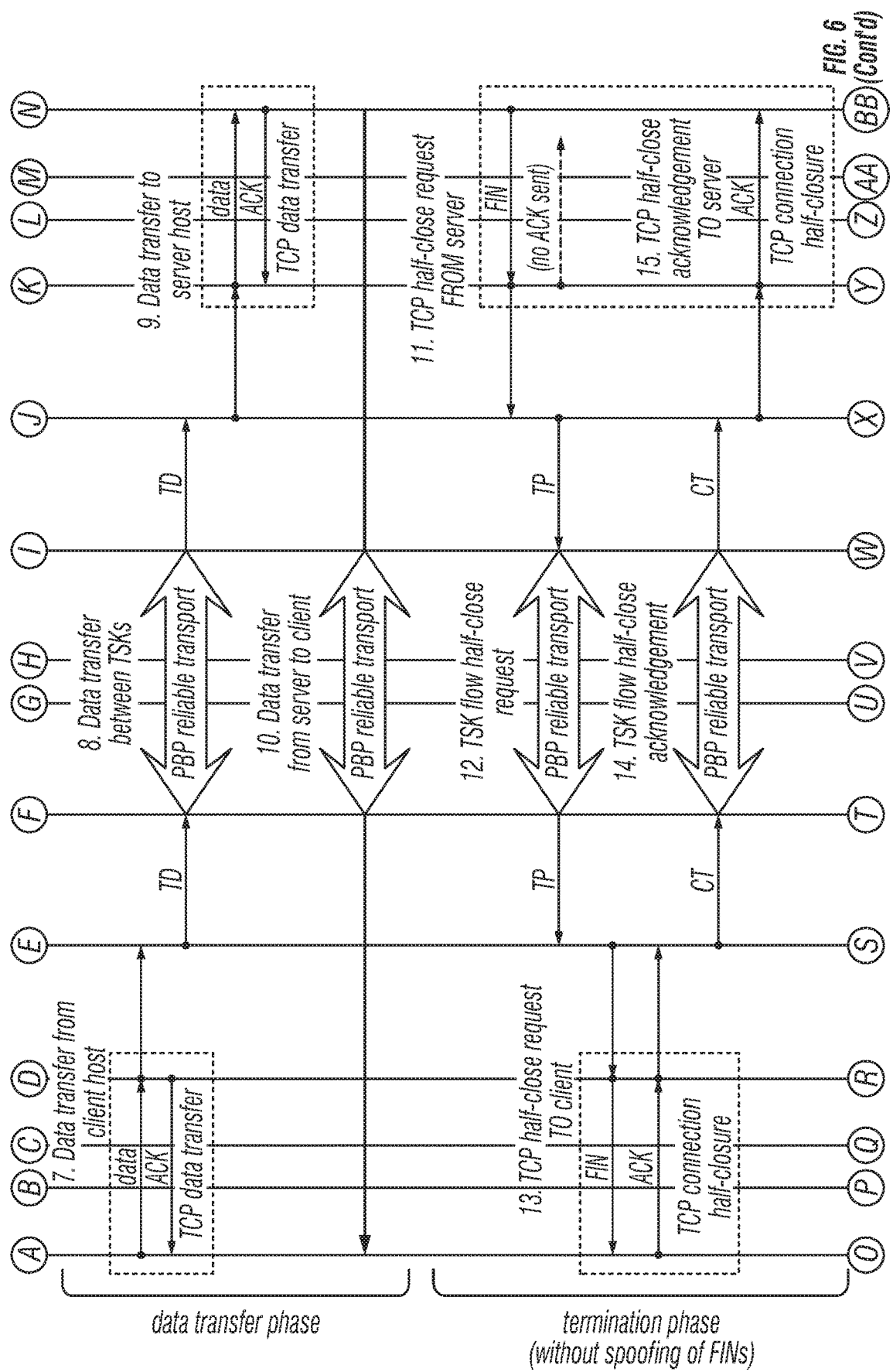
Figure 6:
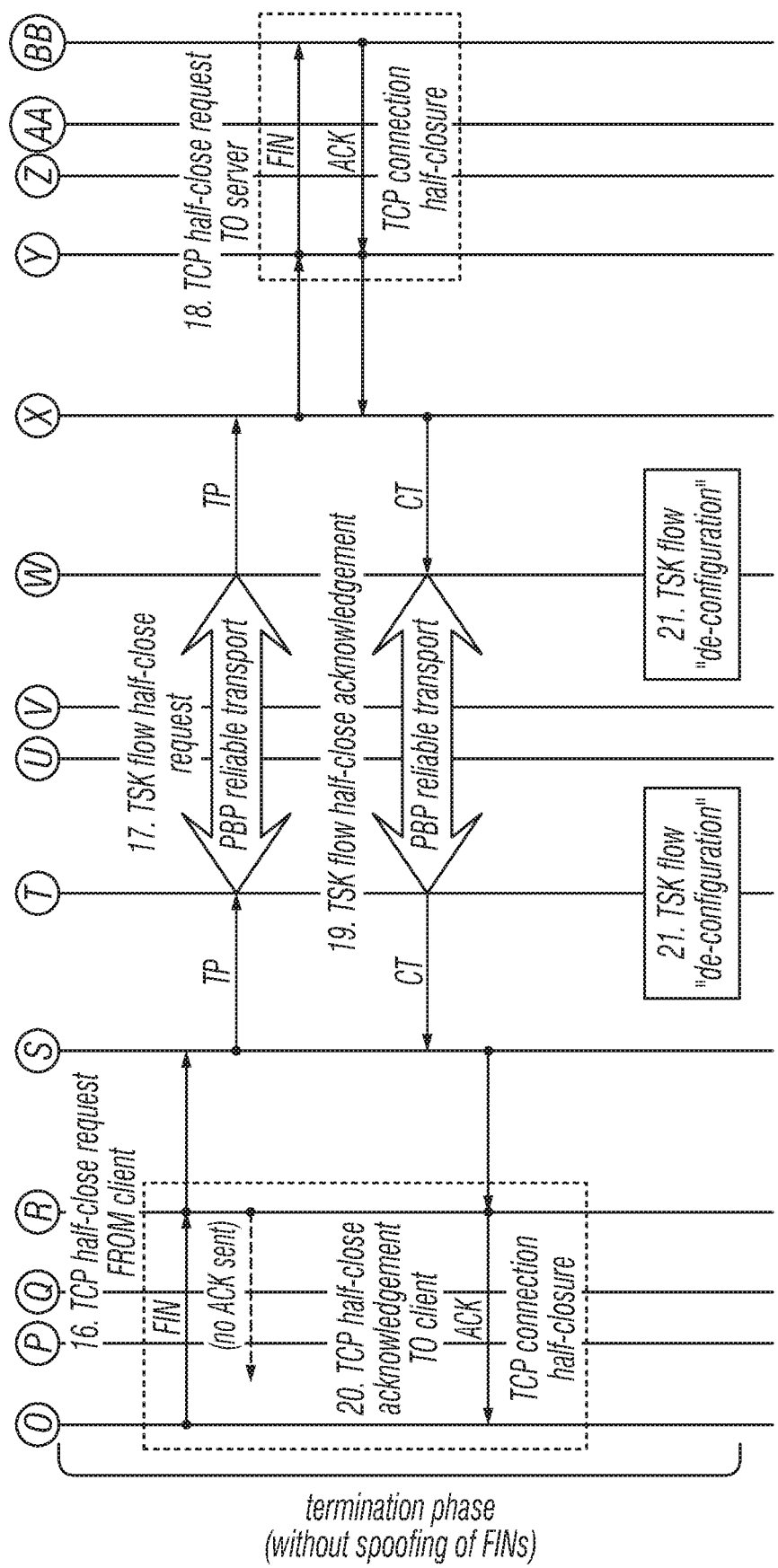

For purposes of explaining an example of flow between end points, FIG. 6 diagrammatically illustrates an example of an operating scenario in which three-way handshakes are not spoofed. For instance, certain types of PEP do not support spoofing of FIN segments.

As can be appreciated from FIG. 6, a backbone connection is assumed to have been established before TSKs transfer data for simplicity in operation 1. However, PBP connections can be created if needed.

During operation 2, one host, which can be referred to as the client (e.g., a terminal 24), attempts to open a TCP connection with a corresponding server host by issuing a TCP SYN segment to the server. $TSK_1$ at the client PEP end point intercepts and accepts the request to open the TCP connection. At the same time, $TSK_1$ prepares to carry the TCP flow to its peer, $TSK_2$ at the destination PEP end point.

In operation 3, the $TSK_1$ provides flow configuration information to $TSK_2$ using the reliable connection provided by PBP. This information allows $TSK_2$ to regenerate the TCP/IP headers properly for sending the data to the destination host (e.g., the server). During operation 4, $TSK_2$, which is pretending to be the client host, attempts to open a TCP connection with the server by issuing a TCP SYN segment to $TCP_3$ in the server.

In operation 5, the server responds with a TCP "SYN-ACK" segment indicating its acceptance of the connection. $TSK_2$ notes that the "SYN-ACK" segment has been received and sends a message, via PBP, back to $TSK_1$ indicating the server has accepted the connection. Meanwhile, $TCP_2$ acknowledges the "SYN-ACK" segment received from $TCP_3$, thus completing the three-way handshake between $TCP_2$ and $TCP_3$.

During operation 6, when $TSK_1$ receives from $TSK_2$ confirmation of connection establishment, $TSK_1$ instructs $TCP_1$ to issue a "SYN-ACK" segment response to the SYN segment received earlier from $TCP_0$, making $TCP_1$ appears to the client as the server. $TCP_0$ acknowledges the "SYN-ACK" segment, completing the three-way handshake between $TCP_0$ and $TCP_1$.

During operation 7, the two hosts can exchange data bidirectionally over the space link with the satellite 14. In this example, the client is sending data to the server, and $TCP_1$ acknowledges such data. Hence, during operation 8, $TSK_1$ sends and acknowledgement to $TSK_2$ via the reliable transport provided by PBP. In operation 9, when the data arrives at the server's PEP end point, the data is sent via the local TCP connection to the server, and $TCP_3$ sends an acknowledgement to $TCP_2$.

As indicated generally by operation 10, data transport from the server to the client is accomplished in a manner identical to that described with regard to operations 7 through 9.

Either the client or the server can close the connection as desired. In this example, the server initiates the connection close procedure. To close the connection, the server sends a TCP FIN segment in operation 11. This FIN segment indicates that the server will send no more data, which is effectively a request to "half-close" the connection from the server to the client. For reliability reasons, the spoofer does not acknowledge the FIN segment immediately. Rather, in operation 12, $TSK_2$ notes the received FIN segment and sends a half-close request to $TSK_1$, which effectively propagates the FIN segment's meaning over the links with the satellite 14. In operation 13, $TSK_1$ receives the half-close request and instructs $TCP_1$ to issue a FIN segment to $TCP_0$, and $TCP_0$ responds with an acknowledgment.

During operation 14, $TSK_1$ notes the acknowledgment and sends a corresponding half-close acknowledgment to $TSK_2$, which indicates that the TCP connection in the server-to-client direction has been closed with the client. During operation 15, $TSK_2$ receives the half-close acknowledgment from $TSK_1$ and acknowledges the FIN segment received earlier from $TCP_3$. This completes the procedure for closing the virtual end-to-end connection in the server-to-client direction. Although data can still be sent from the client to the server, such sending of data rarely occurs as a practical matter.

As further shown, a similar end-to-end half-close procedure is conducted to close the virtual end-to-end connection in the client-to-server direction during operations 16 through 20. Since the two TSKs thus realize that the virtual end-to-end connection has been fully closed, the two TSKs free resources used to support the virtual end-to-end connection.

Figure 7:
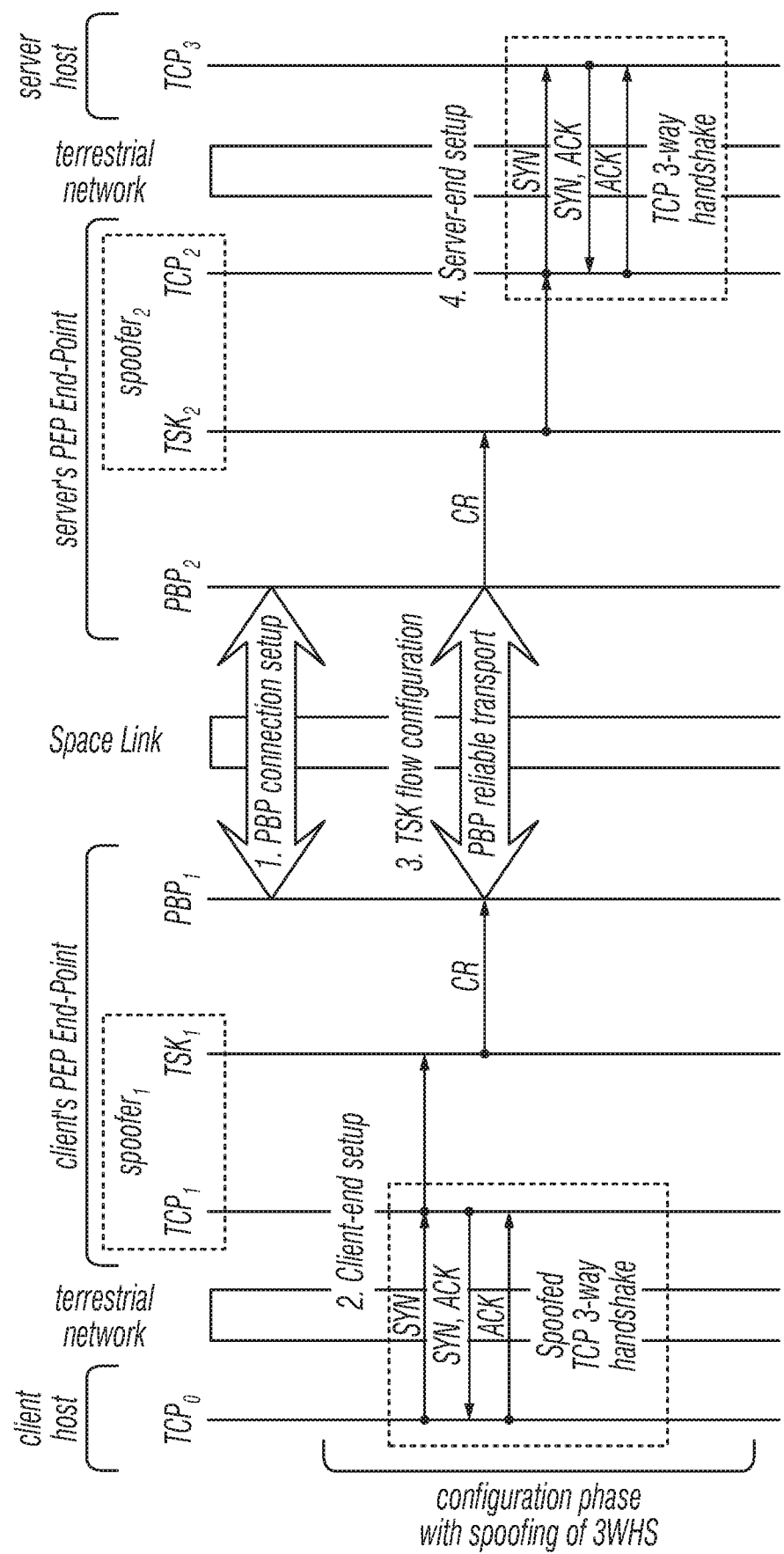
FIG. 7 illustrates an example of three-way handshake spoofing which can be performed in the flow diagram of FIG. 6.

It should also be noted that spoofing of a three-way handshake is configurable. Thus, such spoofing may be configured to be turned on for more traffic types than HTTP and, in particular, for HTTPS and Web Acceleration. The flow diagram of FIG. 7 illustrates an example of three-way handshake spoofing which can be performed instead of operations 2 through 6 in the flow diagram of FIG. 6.

As in the flow diagram of FIG. 6, it is assumed in operation 1 that a backbone connection has been established before the TSKs transfer data. During operation 2 in the flow diagram of FIG. 7, a web browsing scenario (HTTP) between the client host and server host is performed. Thus, the client host attempts to open a TCP connection with a server host. This TCP connection would typically be opened for sending an HTTP GET message subsequently, and for requesting an object which would be returned over the same TCP connection. $TSK_1$ at the client PEP end point intercepts and accepts the request to open the TCP connection, thus responding as if it were the actual destination. At the same time, $TSK_1$ prepares to carry the TCP flow to its peer, $TSK_2$, at the destination PEP end point.

During operation 3, the $TSK_1$ provides flow configuration information to $TSK_2$ using the reliable connection provided by PBP. This information allows $TSK_2$ to regenerate the TCP/IP headers properly for sending the data to the destination host (the server). During operation 4, the $TSK_2$, pretending to be the client host, opens a TCP connection with $TCP_3$ in the destination host. At this point, the two hosts can exchange data bidirectionally using spoofing over the space link with the satellite 14. Also, it is not necessary for this operation 4, or even the previous operation 3, to have been completed before the source host begins sending data.

Accordingly, the $TCP_0$ in the client host uses the TCP connection established in operation 1 to send data to $TCP_1$, believing that the near-end spoofer to be the actual server host, and $TCP_1$ acknowledges this data. Data received from the client is sent over the space link using the reliable transport provided by PBP. At the server's PEP end point, the $TCP_2$ transports data received from $TCP_1$ to $TCP_3$ using the TCP connection established in operation 4. Data transfer from the server to the client, as for a requested HTTP object, is further accomplished as described above with reference to the flow diagram of FIG. 6.

It should further be noted that TCP connections at destination PEP end point with different LAN speeds over the same backbone can potentially block each other. For example, if the traffic (TCP connections) to a slow host connected via Wi-Fi and a fast host connected via Ethernet travel over the same PEP backbone, the TCP connection to a slow host can block the TCP connection going to fast host. This occurs because the terminal 24, such as the destination PEP end point, cannot drain packets fast enough to the slow host. As a result, the PBP buffers, such as the WAN-to-LAN buffers 40 shown in FIG. 1, begin filling up with packets meant for slow host. As the available buffer space decreases, the PBP acceptance window advertised by the PBP is reduced, which reduces the TCP receive window exposed by the source PEP end point's TSK to its source end-hosts. However, by this time, the source TSK has acknowledged many (spoofed) packets and has queued the packets in source PBP buffers, such as buffers 40.

Figure 8:
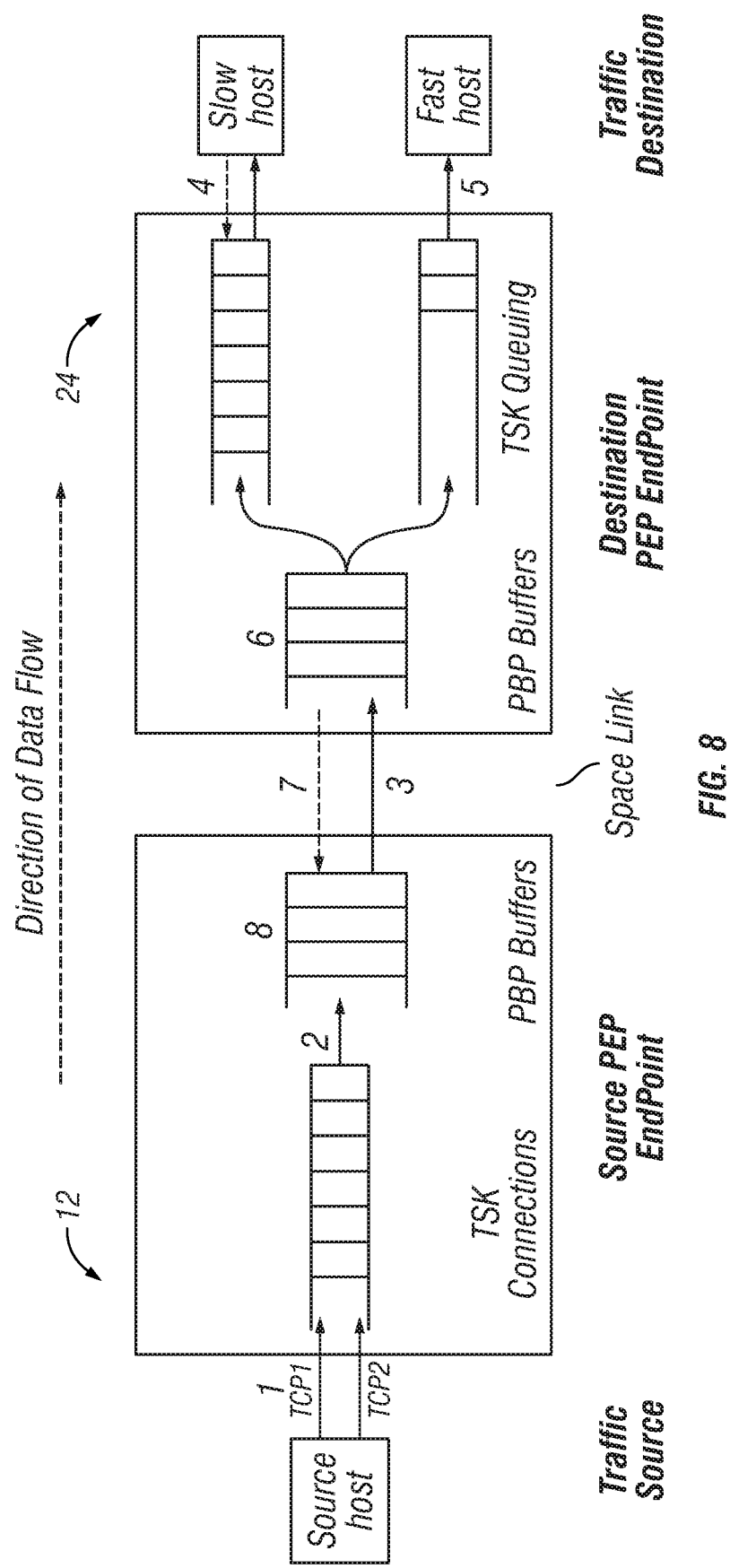
FIG. 8 is a flow diagram of an example of a buffering scenario performed in the satellite communication network shown in FIGS. 1 and 2.

FIG. 8 is a flow diagram of an example of a scenario in which the TCP connection to a slow host blocks other TCP connections. At flow point 1, the source host, such as a web site or service application on the Internet, has two TCP connections, with one going to a slow host and another to a fast host. As shown at the destination end, such as at the terminal 24, the slow host is connected to the user via a slow wireless link, and the fast host is connected to the user via a fast ethernet link. At flow point 2, the two TCP connections have the same priority, and hence they are mapped on to the same PEP backbone. The source PEP end point spoofs the TCP connection by locally sending ACKs to the source end-host.

At flow point 3, the TCP segments are carried over to the destination PEP end point over the PEP backbone. At flow point 4, the slow host drains the packet slowly by reducing its TCP receive window. As a result, the associated TSK queue starts filling up. At flow point 5, the fast host drains the packet faster than the slow host, and as a result, its associated TSK queue can accommodate more packets. At flow point 6 at the destination, PBP buffers (e.g., buffers 40 shown in FIG. 1) are occupied by packets to slow host, because packets are not yet acknowledged from the destination slow host. Thus, the PBP buffers start filling up because the slow host is not draining packets. As a result, destination PEP end point reduces its PBP acceptance window as indicated by the flow arrow 7. By this time, the PBP buffers at the source PEP end point at flow point 8 are occupied by packets meant for slow host at the destination. As a consequence, even though fast host can drain packets, source PEP end point cannot transmit packets on the PBP backbone.

In certain systems, such as the Spaceway system by Hughes Network Systems, the TSK sends all the packets it has already acknowledged to end hosts to PBPK queues. To address the above described problem, the PEP provides buffers per TCP flow at the source TSK as shown, for example, in FIG. 9. By providing buffering at the source TSK, such as by using buffers 23 shown in FIG. 1, packets are queued in TSK queues. Furthermore, source PBPK pulls the packets in, and send the packets when the PBSK is able to send packets over the space link. Because the packets are moved just in time to the source PBPK queues from source TSK queues, the buffer size required at source PBPK is smaller.

An advantage of buffering packets at source TSK are that the source TSK gets more visibility on buffer usage by individual TCP connections and hence, the TCP receive window advertised to the source end-host is adjusted based on buffer usage for individual TCP connections instead of global memory usage. This prevents any single TCP connection from occupying the source PEP (TSK and PBPK) buffers completely. Another advantage is that the destination TSK sends a message to source TSK if the destination TSK's queue-depth reaches a configurable limit for a TCP connection. This message informs the source TSK to slow down (or completely stop) the packets for that particular TCP connection. A further advantage is that at the source PEP and specifically, the source TSK, packets from one TCP connection are kept out of the way of other TCP connections for as long as possible. Thus, it is easier to move the packets of a TSK connection to a different backbone connection.

Figure 9:
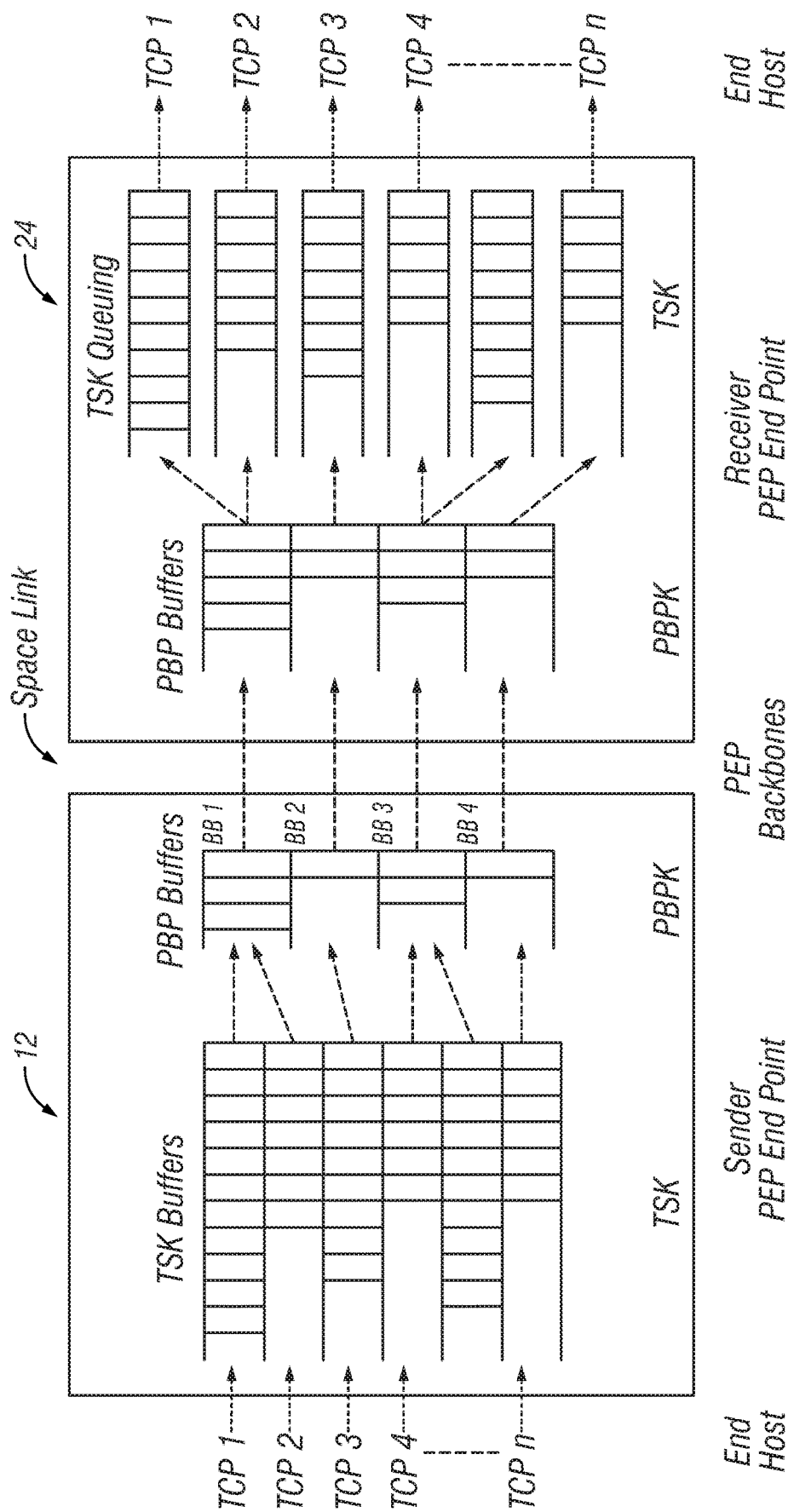
FIG. 9 is a flow diagram of an example of another buffering scenario performed in the satellite communication network shown in FIGS. 1 and 2.

As further shown in FIG. 9, TSK buffering, per a TCP connection, is provided only on the uplink, that is, at the source PEP end point. TSK buffering at the destination PEP end point at the receiving end is not required. Rather, at the receiving end, the packets are buffered at the PBP. Also, destination TSK queue, per a TCP connection, has an upper limit on the queue depth. This upper limit on the queue depth is used in preventing any one TCP connection from occupying the destination PBP buffers completely. At the destination PEP end point, if the TSK queue per flow is becoming full, then the destination TSK sends a message to source TSK to reduce or stop sending packets on that particular TSK flow. When a source TSK receives such a message, the source TSK decreases the TCP receive window exposed to the source end-host to slow down the source end-hosts that feed TSK buffers. Thus, this type of TSK level message to flow control provide a quicker response, and better PEP flow control, when a TSK flow exceeds its buffer limits. Also, PBP buffers are not monopolized by one connection, which potentially blocks other connections.

In addition, the TSK services each of the spoofed TCP connections and gives the packets to PBP. Flow control at the TSK is achieved through TSK messaging. The TSK at the receiving PEP end point sends messages to the source TSK to slow down, stop, increase or start the traffic for a particular TSK flow as follows.

When an FD message is received from the peer TSK, the TSK at the traffic source reduces the TCP receive window that is advertised to its local TCP end hosts to slow down the incoming traffic on this TCP connection. TSK also reduces the send window to the minimum of advertised receive window and the default configured window. These operations slow down the traffic for a particular TSK flow.

When an FS message is received from the peer TSK, the TSK at the traffic source advertises a Zero TCP receive window, to completely shut down the receive window, to its peer TCP end host. These operations completely stop the traffic for a particular TSK flow.

When an FI message is received from the peer TSK, the TSK at the traffic source increases the TCP receive window that is advertised to its local TCP end hosts to increase the incoming traffic on this TCP connection. The TSK also increases the send window to the minimum of advertised receive window and the default configured window. These operations increase the traffic for a particular TSK flow.

When an FR message is received from the peer TSK, the TSK at the traffic source advertises the updated TCP receive window, to open the receive window, to its peer TCP end host. The TSK also updates the send window to the minimum of the advertised receive window and the default configured window. These operations start the traffic for a particular TSK flow.

As described above, TSK flow control is achieved by advertising a suitable TCP receive window, by a spoofed TCP connection, to the end-host based on the available space in TSK buffers for that traffic flow. This limits the amount of the buffer (e.g., buffer 40) allocated to individual TCP connections. At the IPGW 52 and a terminal 24, the TCP receive window to the end hosts is adjusted based on total TSK buffers available, instead of available TSK buffer for individual TCP connection, since calculating the TCP receive window based on the TSK buffer usage by individual TCP connections adds much overhead, especially for the IPGWs 52.

In addition, the traffic sources such as web servers and other devices, like WAN sources, send packets from the Internet side of the IPGW 52 towards the terminals 24 and to the end-hosts. These WAN sources feed the IPGWs 52 at the highest possible rate that IPGW buffering (e.g., LAN2WAN) allows. The IPGWs 52 feed the data through an SGW 40 towards the terminals 24. Depending on the amount of data, the SGW 50 feedbacks the flow control information (e.g., waiting time) to individual IPGWs 52. In the following scenarios, congestion can be worsened.

In the case of congestion at the IPGW PEP end point, the delay in receiving the PBP ACKs from a terminal 24 increases. As a result, an IPGW 52 tries to resend the packet to the terminal 24. This results in duplicate packets at the SGW 40, which further worsens the congestion situation.

In addition, the TCP connections on the WAN sources give-up due to long delays in response from the peer TCP on terminal end-hosts. Since the IPGW 52 sends PEP ACKs immediately to its WAN sources, the IPGW 52 is committed to send the packets to the terminal PEP end point. As a result, the IPGW 52 attempts to send packets of a terminated TCP connection.

To overcome these drawbacks, the disclosed embodiments proportionally decrease the CIR to push back the WAN source queues. By doing this, the IPGW 52 communicates to WAN sources to either slow down or not to transmit. To prevent a cascading congestion effect, the PEP at the IPGW 52 can limit the source TSK buffers to a configurable value to flow control individual TCP connections, and the TSK at the IPGW 52 employs RED to drop the packets. By dropping the packets instead of sending an ACK and queuing them at TSK buffers, WAN sources are shutdown/slow down quickly.

Figure 10:
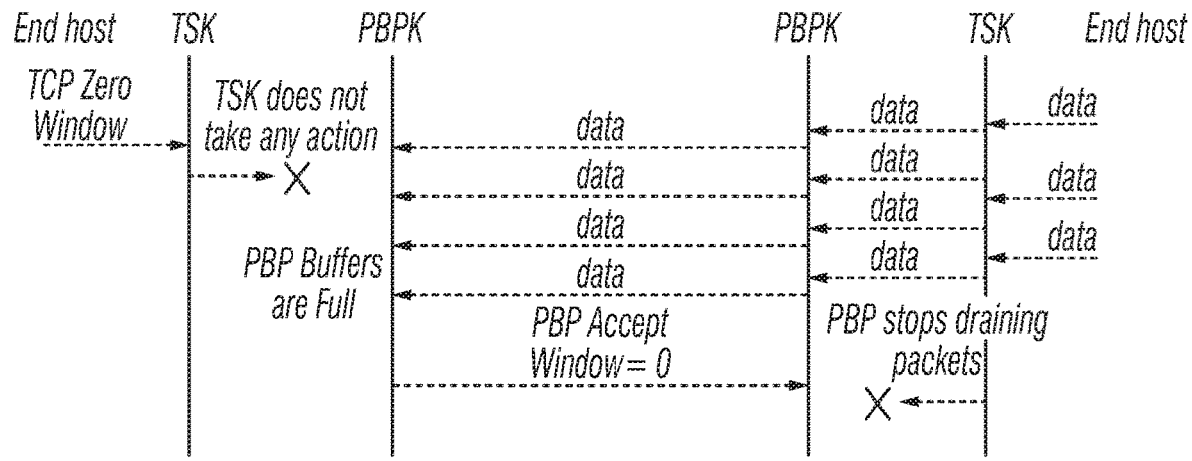
FIG. 10 is another flow diagram illustrating an example of communications performed in the satellite communication network shown in FIGS. 1 and 2.

In addition, a potential TCP window management problem that exists can be referred to as a "TCP Zero Window" issue or "Close Window" issue. The TCP Zero window issue, as shown in the flow diagram of FIG. 10, arises because of the following operations.

It is assumed that traffic is flowing from the IPGW 52 towards the terminal 24. The end host TCP at the traffic destination (e.g., an end user device 44) sends a TCP Zero Window to the TSK at the terminal 24, for example. The TSK at the terminal 24 does not communicate this to peer (IPGW 52) TSK or to the PBPK of the terminal 24. The PBSK at the terminal 24 continues to accept packets from the IPGW 52 peer PBP, and buffers the packets in the buffer 40, for example. Because the end host (end user device 44) on the terminal side is not ready to accept any packets, the TSK at the terminal 24 cannot send packets to end host. Thus, the PBP buffer 40 at the terminal 24 starts filling up. Eventually, the PBP buffer at the terminal 24 becomes full and a PBP Acceptance Window of ZERO is advertised to the PBP of the IPGW 52. As a result, the PBP of the IPGW 52 stops sending more packets and also stops consuming packets from its TSK. The TSK of the IPGW 52 therefore eventually stops draining packets from traffic source (i.e., the server).

Figure 11:
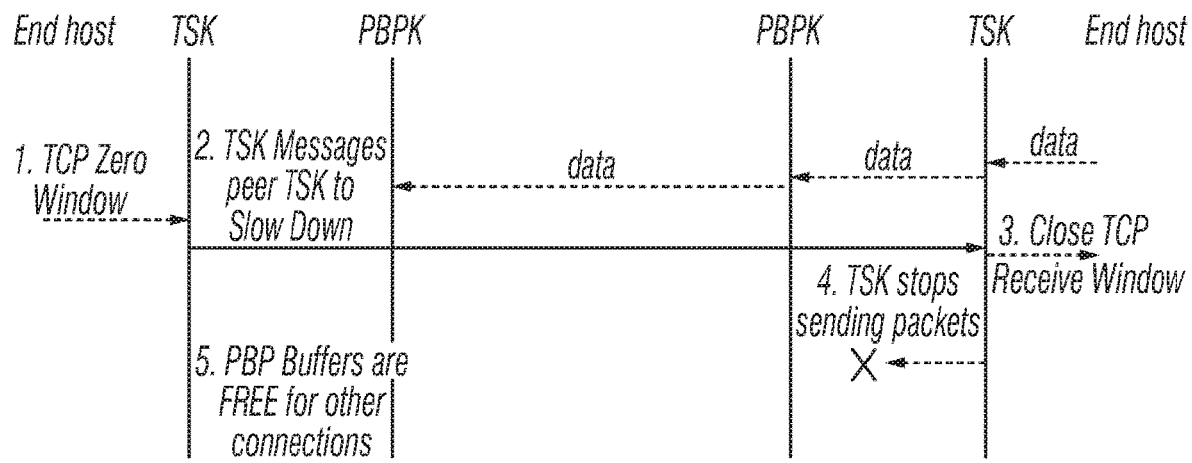
FIG. 11 is another flow diagram illustrating an example of communications performed in the satellite communication network shown in FIGS. 1 and 2.

To address this issue, the disclosed embodiments operate as shown, for example, in FIG. 11. That is, the TSK messaging communicates a TCP Zero Window to the TSK peer. Also, the TSK support for probing the Zero Window can be performed from the end host.

Therefore, as shown in FIG. 11, the TSK communicates a Zero Window to its peer TSK and stops/slows down packets flow of TCP connection. In particular, in operation 1, the end host TCP (the TCP at the end user device 44) sends a TCP Zero Window to the TSK of the terminal 24. In operation 2, the TSK of the terminal 24 communicates a message not to send packets for a configurable time interval by sending an "FS" TSK message to its peer TSK. In operation 3, the peer TSK stops sending packets on that TSK connection for the configurable time interval OR until a "resume message" (FR TSK message) is received from TSK. In operation 4, the Peer TSK also stops draining packets from the end host TCP. During operation 5, the PBP advertises acceptance window depending on available buffer, so that other TSK connections on this backbone continue to use the backbone.

In each TSK queue servicing epic, the bandwidth for spoofed traffic (all of the TSK connections on a particular backbone) is determined based on the PBP Send Window, available bandwidth and, number of spoofed and unspoofed connections. This bandwidth is used to service/schedule the TSK connections. If a particular TSK connection had been signaled by its peer TSK to "stop" data transfer, then that TSK flow would be treated as inactive and not be given any bandwidth. At the IPGW 52, the TSK queues belonging to the highest priority backbone (backbone 1) of all the terminals 24 are serviced before servicing the next priority backbone (backbone 2). The TSK queue servicing itself occurs independently for each of the Terminal at the backbone priority level. At the terminal 24, the TSK queues belonging to highest priority backbone (backbone 1) are serviced first and then, the TSK queues belonging to the backbone with next highest priority (backbone 2) are serviced, and so on. TSK queue scheduling for backbones with priorities 1 and 2, such as conversational and Interactive traffic classes, differs from that of scheduling for backbones with priorities 3 and 4, such as streaming and Backbone traffic classes. This minimizes the latency for conversational and interactive traffic.

In a non-congested scenario, these TSK queues are serviced instantaneously. That is, as soon as there is some packet in TSK queues, provided the following conditions are true: the TSK queues are serviced one after another, completely draining the packets to the CoS buffers/queues:

aggregate bandwidth required to completely service all TSK queues is less than maximum bandwidth allowed for this backbone;

the PBP Send Window for this backbone has room to completely service all TSK queues; and no (credit) rate control is reported from the lower layers (i.e., no congestion).

If any of the above listed conditions is not satisfied, the TSK queue scheduling algorithm services the TSK queues in a (modified) round robin fashion. The epic, or time interval, at which the queues are serviced depends on scheduler invocation from the lower layers. TSK queue servicing can be done independently for each backbone or traffic class. For instance, the TSK queues for streaming and background traffic class are serviced less frequently compared to that of TSK queues belonging to conversational and interactive traffic class. A modified round robin scheduling algorithm is used to service the TSK queues. The epic or time interval at which the queues are serviced depends on scheduler invocation from the lower layers.

A modified round robin algorithm can be used, which is similar to a standard round robin algorithm, in which every queue gets a fixed equal opportunity in a circular order, servicing all the queues without prioritizing one queue over the other. The round robin algorithm is simple, easy to implement and starvation free. One potential problem with standard round robin approach is that the number of passes is not guaranteed. If the available resources are large, giving fixed equal portion to every queue results in multiple passes, which is undesirable while servicing the TSK queues. Thus, the standard round robin algorithm is modified as described below.

In each scheduling interval, the maximum credits (bandwidth) per TSK queue (in equal portion) that can be allocated is determined (i.e., credits per TSK queue=Total credits/number of active TSK queues). If credits per TSK queue is greater than (a configured parameter) "minimum credits", use credits per TSK queue and service all the queues. If credits per TSK queue is less than (a configured parameter) "minimum credits", use "minimum credits" and service a subset of the queues.

An optimization feature that is suggested to improve the TSK connection startup time is to give preferential treatment to the new TSK connections. By servicing the newly arrived TSK connections before servicing other active TSK connections using, for example, a modified round robin approach, the TSK connection startup times can be improved. Typically, new TSK connections have smaller packets in the queue and do not consume much bandwidth.

Figure 12:
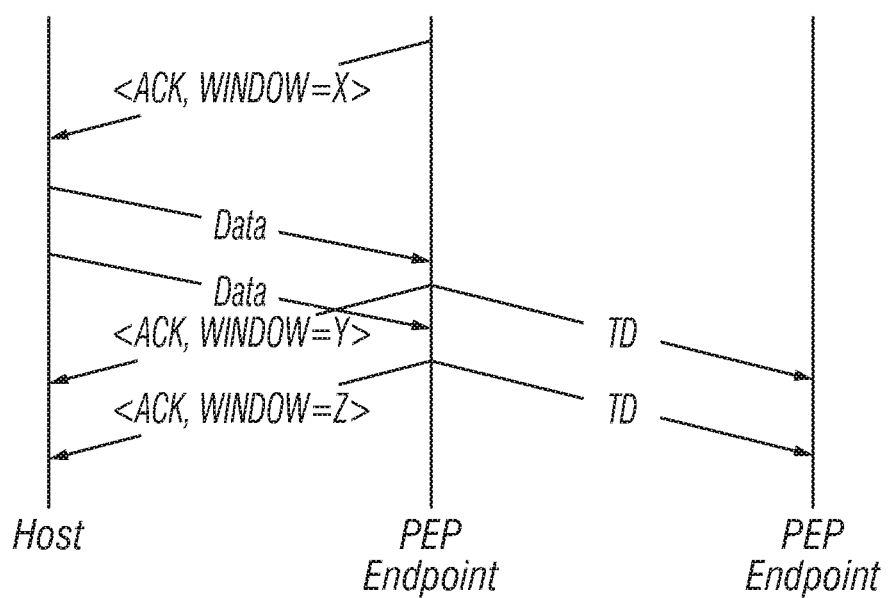
FIG. 12 is a further flow diagram illustrating an example of communications performed in the satellite communication network shown in FIGS. 1 and 2.

After a TCP connection has been established between a local host and the TCP Spoofing Kernel, the host and TSK can send data to each other. When a data segment is received at the PEP end point, the platform environment can pass the data to the TSK along with the received TCP segment. With respect to sending data to the host and recovering from any dropped data segments, the TSK can comply with all of the relevant Internet Engineering Task Force (IETF) standards (e.g. RFC 793), including the standards which govern slow start and congestion avoidance (e.g. RFC 2581). With respect to receiving data from the host, TCP advertises a receive window to the host and locally acknowledges data received from the host. Acknowledged data is forwarded by TSK to its TSK peer as shown, for example, in FIG. 12.

The receive window advertised by the TCP Spoofing Kernel to the local host in any given TCP <ACK> segment will be the minimum of the windows determined from several calculations. These windows are determined by the maximum receive window size configured for the PEP End Point, the previous window size advertised and the amount of buffer space available for TCP spoofing. For each TCP/IP datagram of a spoofed flow received from the host (on the LAN connection), TSK substitutes a "TSK header" for the TCP/IP header of each IP datagram and sends the resulting construct to its peer TSK via a backbone connection. The TSK header bears the TSK flow ID associated with the IP addresses and TCP port numbers for the spoofed flow.

TCP spoofing splits a spoofed TCP connection into two terrestrial TCP connections and a space link TSK connection. To achieve end-to-end flow control, it is required to provide flow control both on the terrestrial (TCP) connections and space link (TSK) connection. It is the responsibility of the PEP TCP spoofer to provide (transport layer, L4) flow control on the terrestrial (LAN) and the space link (WAN) segments. The TSK flow control discussion is classified as TSK-TCP flow control on the LAN (Terrestrial link); and TSK-TSK flow control on the WAN (space link).

To adjust the TCP receive window, a standard TCP flow control mechanism can be used to adjust the TCP receive window to flow control individual TCP connections. The TCP receive window that is advertised to the end host TCP depends on total buffer usage (by all spoofed TCP connections on a PEP backbone), average TCP receive queue depth (at PEP TCP Spoofer), flow control messages from the peer TSK (for a particular flow). The amount of incoming traffic from end host can be regulated by using RED (at TSK) to drop received packets (before acknowledging) from end host on a random TCP connection. The RED drops the packets depending on the drop probability. The drop probability is calculated, for example, per traffic class (also known as priority) and depends on various factors including total buffer usage (by all spoofed TCP connections on a PEP backbone), average TCP receive queue depth (at PEP TCP Spoofer), Service plan rate, congestion (or available bandwidth), and so on. A TCP receive window of Zero is advertised to the end host TCP for a particular TCP connection if a FS (Flow Control—Stop) TSK message is received from the peer TSK. When the peer TSK sends a FR (Flow Control—Resume) TSK message is received from the peer TSK, then the receive window is advertised as discussed above.

Depending on available buffers, advertised PBP send window and transmission opportunity reported from layer 2, PBP calculates and allocates the credits (bytes) to TSK. The PBP reports credits (per backbone) to TSK. It is the responsibility of TSK to fairly split (at the byte level) the credits among all spoofed TCP connections. This is discussed in TSK Queue Servicing. On receiving a FS (Flow Control—Stop) TSK message for a particular TSK connection from the peer TSK, the TSK Queue Servicing algorithm stops servicing that TSK connection. That is, packets from that TSK connection are not drained to the PBP queue. On receiving a FR (Flow Control—Resume) TSK message for a particular TSK connection from the peer TSK, the TSK Queue Servicing algorithm starts servicing that TSK connection. Depending on the FI (Flow Control—Increase) and FD (Flow Control—Decrease) TSK messages, the TSK Queue Servicing regulates the amount of bytes drained from each TSK queue to PBP queues.

There are two cases in which the source spoofer should not drain its buffers to the PBP buffers. In the first scenario, the destination spoofer has indicated that its buffers are full, and so cannot accept additional data. This may be because the destination terrestrial network is congested, or the destination end-host is slow. In the second scenario, the space link buffer is backing up. This can arise because the data is arriving too quickly, or because the congestion management operations are scaling back service rates because of congestion.

Figure 13:
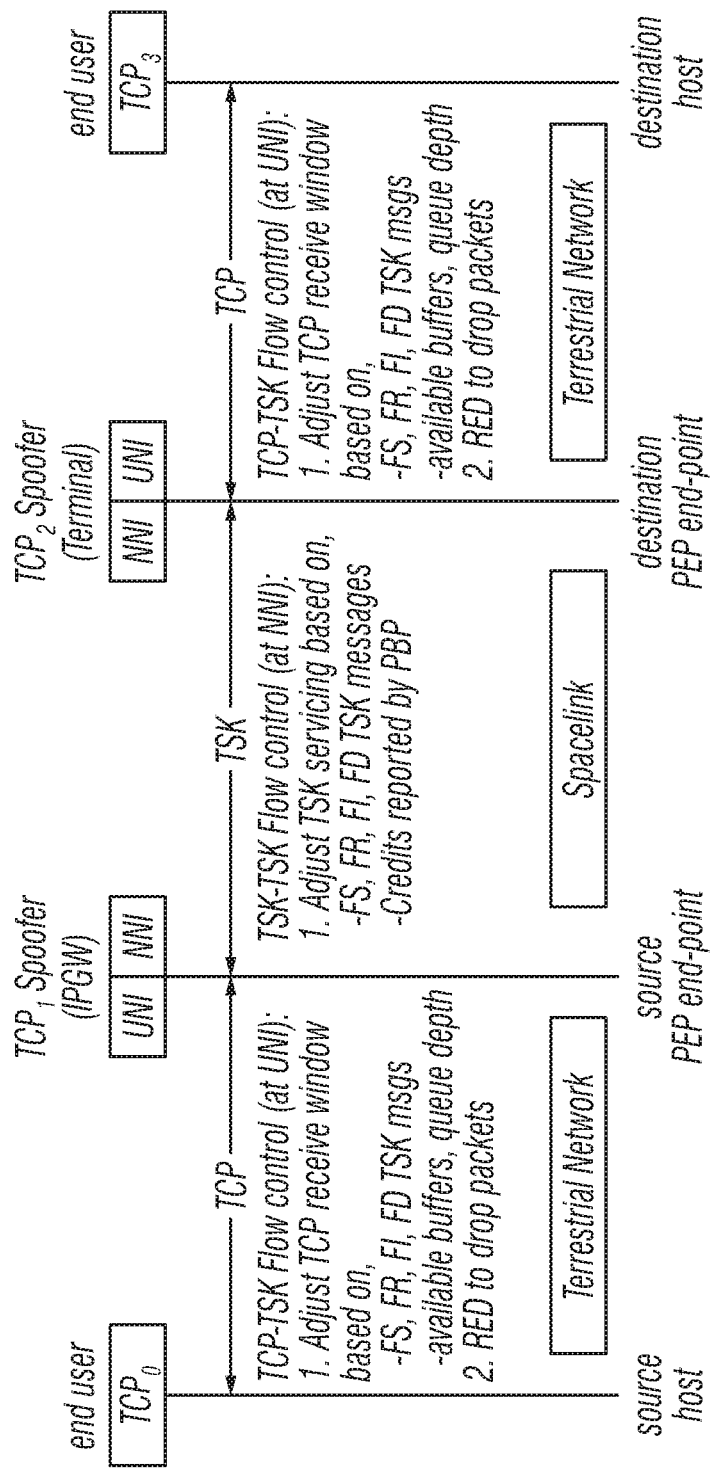
FIG. 13 is another diagrammatic view showing an example of the relationship of elements for spoofing as performed in the satellite communication network shown in FIGS. 1 and 2.

As shown in the flow diagram of FIG. 13, which is similar to FIG. 5, the PEP at the receiving end monitors the occupancy of the TSK buffers through which it feeds an associated TCP and to accordingly adjust the transmission rate for the TSK flow. Similarly, the PEP at the sending end processes any TSK flow control messages and also monitors the occupancy of the (TSK) buffer through which it feeds its associated PBP, and accordingly adjusts TCP's acceptance window to the local end-host.

The scenario in which the destination spoofer indicates its buffers (e.g., buffers 40) are full will now be discussed. When the $TCP_0$ wants to send traffic to $TCP_3$, the $TCP_0$ opens a TCP Session with $TCP_3$, which is intercepted by $Spoofer_1$. A spoofed TCP connection gets established between $TCP_0$ and $TCP_1$. $Spoofer_1$ establishes a TSK connection over PEP backbone with $Spoofer_2$. In-turn, $TCP_2$ at $Spoofer_2$ opens a spoofed TCP connection with $TCP_3$ of end host (WAN sources). When $TCP_0$ starts sending traffic to $TCP_3$, $TCP_1$ at $Spoofer_1$ intercepts and queues at $TSK_1$, which is then given to $PBP_1$ for transmission. $PBP_1$ at $Spoofer_1$ then forwards this data to $PBP_2$ at $Spoofer_2$. $TCP_3$ may not be able to receive traffic fast enough either due to congestive loss or because of slow application. In such a scenario, $TCP_3$ cannot drain data fast enough on this TCP session. As a result, the data gets buffered at (TSK and PBP) $Spoofer_2$. In such a situation, when buffers (e.g., buffers 40) at $Spoofer_2$ are getting full, the following operations can be performed by the TSK/PEP as indicated by numbers (1) through (5) in FIG. 14.

Figure 14:
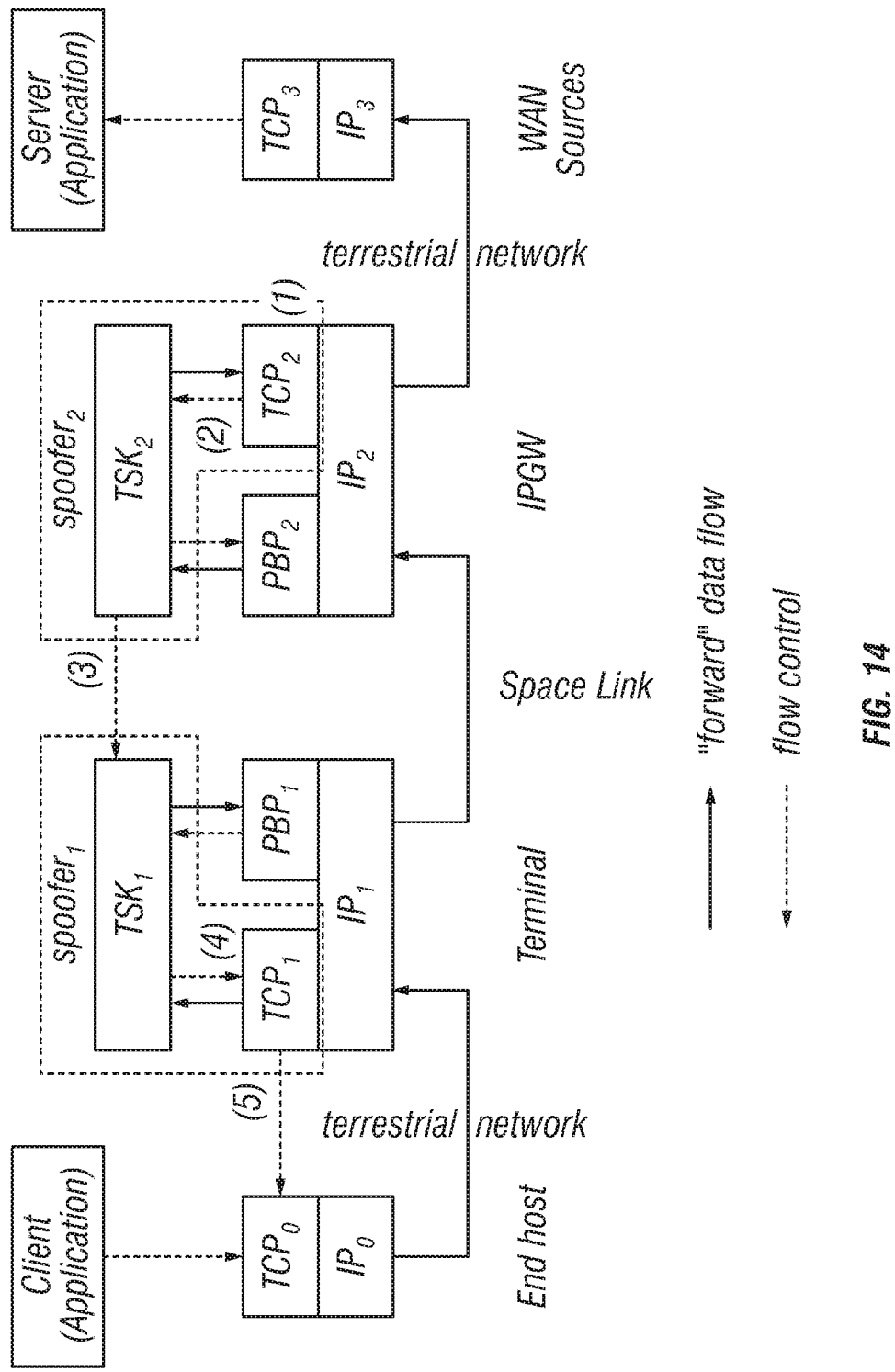
FIG. 14 is a further diagrammatic view showing an example of the relationship of elements for spoofing as performed in the satellite communication network shown in FIGS. 1 and 2.

For example, as shown in FIG. 14 the $TCP_2$ reduces its send window, either because congestive loss is detected, or the destination host is slow, and the buffer that is used by $TSK_2$ to feed $TCP_2$ begins to significantly fill, as indicated by (1). $TSK_2$ notices the buffer is filling (2), and therefore, the $TSK_2$ instructs (using TSK level messaging) its peer TSK, $TSK_1$ to reduce its transmission rate (3). Also, $TSK_1$ instructs $TCP_1$ to reduce its acceptance window (4). $TCP_1$ reduces it's receive window and reports the reduced window size to the peer $TCP_0$ (5). $TCP_0$ accordingly reduces its send window.

It should be noted that in a system in which TSK level messaging for flow control is not supported, then instead of $TSK_2$ instructing its peer TSK, $TSK_1$ to reduce its transmission rate, the following operations are performed. The $TSK_2$ instructs $PBP_2$ to reduce its acceptance window. $PBP_2$ reduces its acceptance window and reports the reduced window size to the peer $PBP_1$. $PBP_1$ accordingly reduces its send window. The buffer that is used by $TSK_1$ to feed $PBP_1$ begins to significantly fill, and so $TSK_1$ instructs $TCP_1$ to reduce its acceptance window.

The above mechanism for flow control may be somewhat slow to react in case of congestion. The TSK/PEP flow control mechanism, with TSK messaging according to the disclosed embodiments, operate to overcome this drawback.

If the space link access buffers fill, then this filling will be detected by $PBP_1$. Flow control in this case follows the operations. The buffer that is used by $TSK_1$ to feed $PBP_1$ begins to significantly fill. In response, $TSK_1$ instructs $TCP_1$ to reduce its acceptance window. $TCP_1$ reduces its acceptance window and reports the reduced window size to the peer $TCP_0$. $TCP_0$ accordingly reduces its send window. Flow control for each spoofed TCP flow is achieved by providing TSK buffering at Source PEP end point. Specifically, each flow uses a common configured default initial TCP receive window size, and this TCP receive window size is adjusted based on available TSK buffers for that flow.

In another example discussed below, operations are performed to ensure sufficient packets are buffered for each TSK flow to support the throughput required to meet the service plan. Also, the buffer usage is limited for each flow based on Flow Service Rate (e.g., LAN throughput) to ensure that a buffer (e.g., buffer 40) is used on-need basis for each flow. The operations ensure slow draining flows/applications do not hog buffers which decreases the maximum number of connections and maximum throughput that can be supported. These operations can be performed, for example, by the controller 34 at the terminal, or by any other suitable combination of processor hardware and software as understood in the art.

The maximum memory/buffer allowed for each flow is dynamically and continuously computed based on the Flow Service Rate. Using the Flow Service Rate, the minimum and maximum threshold of memory (buffer) usage for each flow is calculated. When the memory usage exceeds the maximum threshold allowed for the flow, then the receiving PEP endpoint sends a flow control message (FC Stop) on this flow to the sending PEP endpoint, so that sender (PEP endpoint) stops sending more traffic on that flow. Similarly, when the memory usage falls below the minimum threshold allowed, then the receiving PEP endpoint sends a flow control message (FC Resume) on this flow to the sending PEP endpoint so that the sender (PEP endpoint) starts sending traffic on that flow. Although the confirmation can be symmetric for terminal and IPGW PEP endpoint, alternatively only a terminal PEP endpoint (e.g., terminal 24) can implement this TSK flow control enhancement, as most of the traffic is from an IPGW 52 to a terminal 24 (downlink or outroute direction), that is, from the Internet 28 to the user (e.g., an end user device 44).

For each TSK flow, the following metrics are calculated periodically. One metric can be a simple average (SA) of LAN throughput. This is a simple average of LAN throughput, and this value has a high variance initially, but settles as the number of observations increases. As it may be difficult to change the overall average with one observation, it may be difficult to detect spikes and drops in the LAN throughput. Another metric can be an exponential moving average (EMA) of LAN throughput. EMA is calculated by weighting recent rates exponentially higher than historical rates. For example, weights of 0.75 for the history of the LAN throughput, and 0.25 for the current LAN throughput. By modifying the weight factor, the average can be made more or less sensitive to recent data. EMA reacts faster to current rate than Simple Average (SA). Similarly, EMA tends to drop significantly for momentary drops in flow service rate. A further metric is a smoothed moving average (SMA) of LAN throughput. The SMA calculates an average over the time period and applies a smoothing factor with alpha=1/n. This metric provides more stable (smoothed) rate than EMA, but the change in the average lags in response to the window size.

Figure 15:
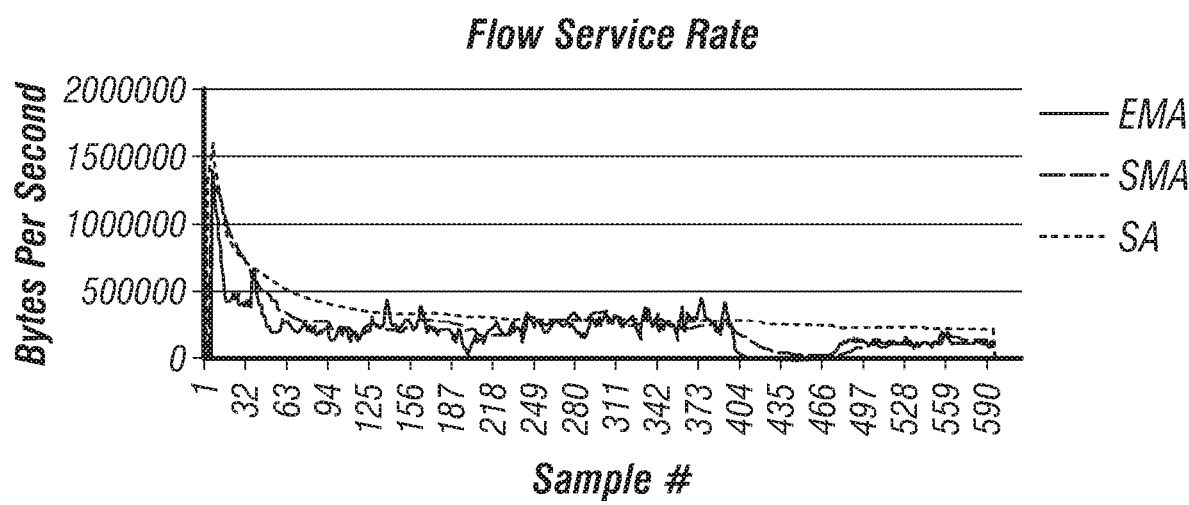
FIGS. 15 through 18 are graphs illustrating examples of flow service rate as effected by the satellite communication network as shown in FIGS. 1 and 2.
Figure 16:
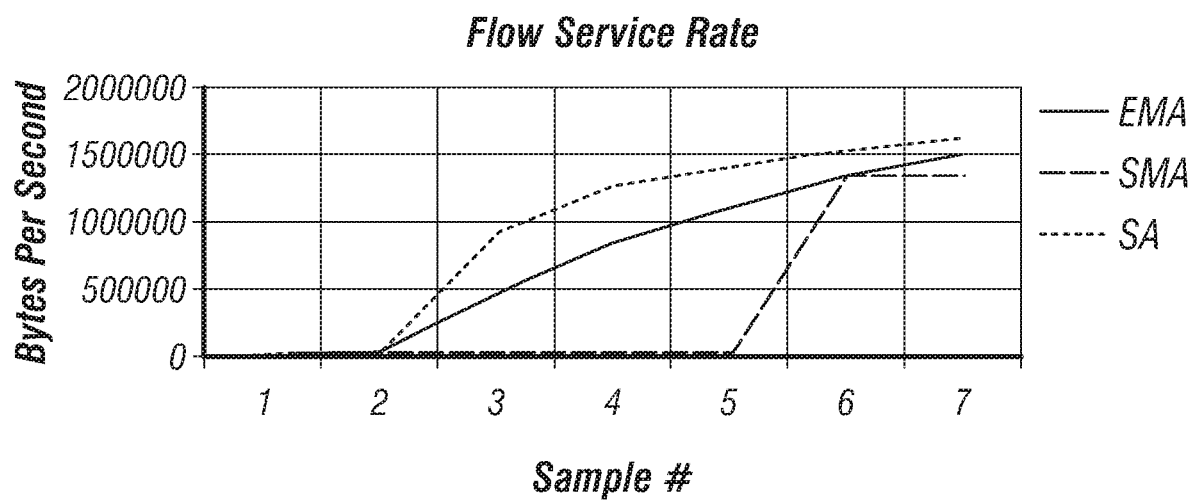
Figure 17:
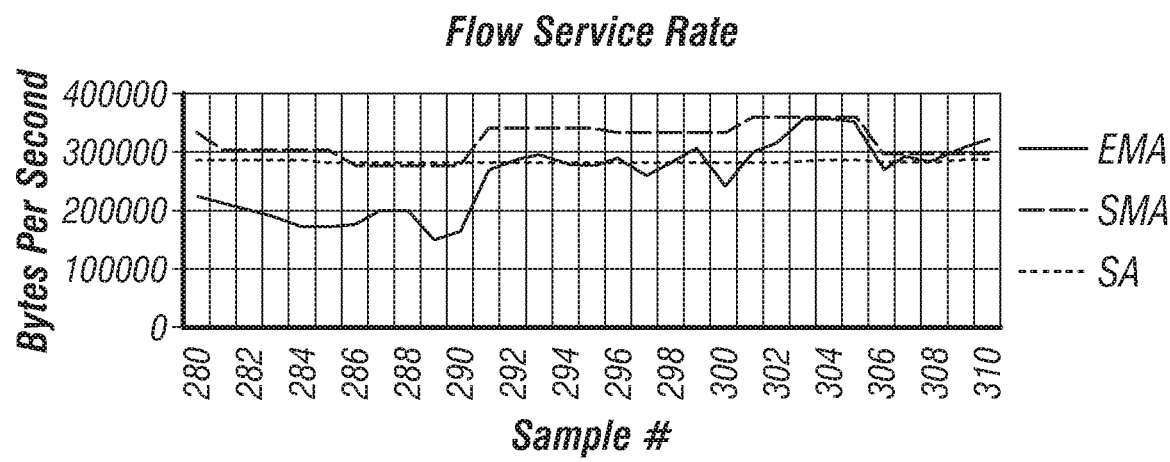

In addition, Flow Service Rate can be determined as maximum of EMA, SMA and SA. That is, Flow Service Rate=max (EMA, SMA, SA). FIG. 15 shows an example of the EMA, SMA and SA during the lifetime of a connection. This approach to determine "Flow Service Rate" is used because due to the lag associated with EMA and SMA, during the connection startup (ramp up), the SA is used as depicted in FIG. 16. When the instantaneous rate drops momentarily, SA may not able to detect this change depending on the duration and traffic bytes on the flow. SMA reacts immediately as it is more sensitive to the recent rate. Thus, SMA is used as depicted in FIG. 17.

Figure 18:
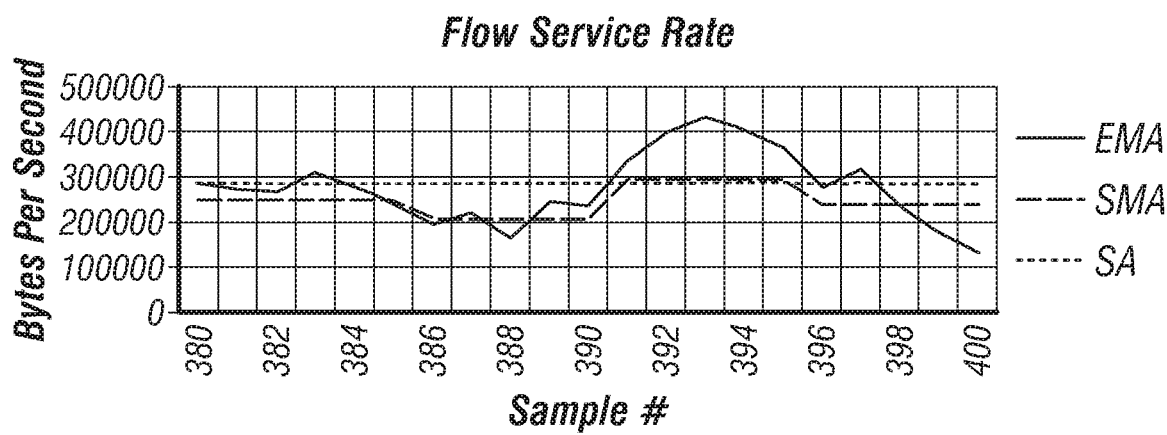

When the instantaneous Rate increases momentarily, SA may not be able to detect this change depending on the duration and traffic bytes on the flow. EMA reacts with a lag but SMA reacts quickly as the weight is more to the recent rate. Thus, EMA is used as shown in FIG. 18.

Using the calculated Flow Service Rate and the configured threshold for memory usage, the TSK FC Stop Buffer Usage Threshold and TSK FC Resume Buffer Usage Threshold values can be calculated as shown below.

TSK FC Resume Buffer Usage Threshold=Lower Threshold*max(Flow Service Rate,Configured Flow Service Rate)*min(Configured Round Trip Time,LLRTT); and TSK FC Stop Buffer Usage Threshold=Upper Threshold*max(Flow Service Rate,Configured Flow Service Rate)*min(Configured Round Trip Time,LLRTT)

where,

Upper Threshold and Lower Threshold are configured maximum and minimum buffer usage thresholds, respectively;

LLRTT is the Lightly Loaded RTT for the PBP connection;

By setting Configured Round Trip Time to a value closer/equal to transport delay (for ex: 600 ms), it is ensured that LLRTT factor is not accounted in buffer threshold calculation; and Configured Flow Service Rate is the lower bound for the Flow Service Rate. This ensures the Buffer Usage Threshold is greater than zero.

Assuming the values Configured Round Trip Time=1000 ms, LLRTT=2000 ms, Configured Flow Service Rate=10 KBps, with Upper Threshold=2, Lower Threshold=1.5 and Flow Service Rate=200 KBps, then the values TSK FC Stop Buffer Usage Threshold=400 Kbytes and TSK FC Resume Buffer Usage Threshold=300 Kbytes are realized.

When the current buffer usage (e.g., the usage of buffer 40) for a flow exceeds the "TSK FC Stop Buffer Usage Threshold", then the PEP endpoint (receiver, such as terminal 24) triggers a TSK FC Stop message to the peer PEP endpoint (sender, such as gateway 12). This causes the reduction in the buffer usage for that flow. When the current buffer usage for a flow falls below the "TSK FC Resume Buffer Usage Threshold", then the PEP endpoint (receiver—terminal 24) triggers a TSK FC Resume message to the peer PEP endpoint (sender—gateway 12). Thus, more packets are requested for this flow. When the end host issues a TCP Zero-window, then the PEP endpoint immediately triggers a TSK FC Stop message if the flow is not already stopped, to the remote PEP endpoint. This causes the reduction in the buffer usage for that flow. However, when the end host (e.g., an end user device 44) opens its TCP Receive Window, then the PEP endpoint triggers a TSK FC Resume if the flow is NOT already resumed, to the remote PEP Endpoint ONLY IF the buffer usage is below the "TSK FC Stop Buffer Usage Threshold."

It should be further notes that controller 34 of a terminal 24 can be configured to effect the following parameters for a terminal 24:

a. Parameter to enable/disable (select) TSK Flow Control algorithm b. Forgetting factor "A" for calculating moving average drain rate used in enhanced TSK Flow Control algorithm.

c. Upper Threshold and Lower Threshold are configured maximum and minimum buffer usage thresholds, respectively.

d. Interval (sec) during which Smoothed Moving average drain-rate is calculated e. Configured Flow Service Rate—this is the minimum drain rate to be used in calculation of the Resume/Stop Thresholds by the Enhanced flow control algorithm. Configured Flow Service Rate is the lower bound for the Flow Service Rate. This ensures the Buffer Usage Threshold is greater than zero.

Moreover, controller 34 of a terminal 24 can be configured to capture the following statistics, which are aggregate of all spoofed connections. These statistics can be displayed on, for example, a local user interface (LUI) associated with the terminal 24, or in any other suitable manner.

1. Number of FC Stops due to zero-window.
2. Number of FC Stops due to window<MSS.
3. Number of FC Resumes due to opening of 0-window.
4. Number of FC Stops that are Terminal Initiated due to buffer>upper threshold.
5. Number of FC Resumes that are Terminal Initiated due to buffer<lower threshold.
6. Number of FC Stops Not Sent as FC stop is already sent due to buffer>upper threshold.
   Typically, TCP 0-window from host triggers a FC Stop message. However, if the TSK FC Stop is already sent due to buffer usage, on receiving a TCP 0-window, the PEP endpoint does not send a TSK FC Stop message. This stat keeps track of such occurrences.
7. Number of FC Resumes Not Sent as buffer>lower threshold when host opened 0-window.
   TCP 0-window from host triggers TSK Stop. When that window is open, it triggers TSK Resume message. With this enhancement, "TSK Resume" upon a window open (from 0-window) will happen only if PEP endpoint does not have sufficient packets buffered (i.e., buffered packets<Resume Buffer Threshold). Thus, we need to track "TSK FC Resumes Not Sent" by the terminal.

The controller 34 of a terminal 24 can further be configured to capture the information indicated below per TSK connection statistics (CCB stats):

1. Receive Window Status (open/close).
2. FC Stop/Resume Status.
3. Moving Avg. Drain-Rate [bps].

4. Smoothed Moving Avg. Drain-Rate [bps].
5. Avg. Drain-Rate [bps].
8. Number of FC Stops due to zero-window.
9. Number of FC Stops due to window<MSS.
10. Number of FC Resumes due to opening of 0-window.
11. Number of FC Stops that are Terminal Initiated due to buffer>upper threshold.
12. Number of FC Resumes that are Terminal Initiated due to buffer<lower threshold.
13. Number of FC Stops Not Sent as FC stop is already sent due to buffer>upper threshold.
14. Number of FC Resumes Not Sent as buffer>lower threshold when host opened 0-window.

In addition to the above, the satellite communication network 10 is configured to address the following issues. For example, a controller 34 of a terminal 24 can be configured to monitor/analyze FC stop/resume messages to identify specific problems at customer premises, such as auto-QoS on the wireless router (e.g., access point 42), which can result in the throttling all connections, thus adversely affecting throughput and performance. The controller 34 can also be configured to combine the FC stop/resume stats with home/Wi-Fi diagnostics for better identification of LAN conditions. In addition, the controller 34 can use FC stop/resume metrics in the terminal diagnostics and update the terminal status code so that the end user, customer support or deep support can identify customers with poor LAN conditions.

It should be further noted that the TSK Flow Control Stop/Resume operations discussed herein address the problems associated with buffering as discussed herein, thus resulting in buffer usage, such as usage of buffer 40 at a terminal 24. However, TSK Floc Control Stop/Resume may on occasion result in saw-tooth behavior of traffic due to the binary nature of flow control (i.e., stop and resume). Also, it is possible that the buffer overshoots the configured upper threshold when TSK Flow Control Resume command is sent. This issue occurs primarily when the difference between terminal LAN throughput and WAN (over-the-air) throughput is high. In addition, the number of connections that experience overshooting and the amount of buffers thus consumed may somewhat limit the maximum connections that can be setup.

Accordingly, the TSK Flow Control according to embodiments disclosed herein perform non-binary (i.e., increase/decrease) TSK Flow Control. For example, a PEP endpoint (TSK), such as that in a terminal 24, makes use of configuration parameters and algorithms from TSK FC Stop/Resume enhancement to determine the average, moving average and smoothed moving average of LAN throughput for spoofed connections. The receiver PEP endpoint (e.g., the controller 34 at the terminal 24) monitors LAN throughput per connection for all spoofed connections. Depending on the configured buffer usage thresholds, the receiving PEP endpoint communicates the desired over-the-air throughput (WAN) for that connection, to the sending PEP endpoint (e.g., the gateway 12). The sending PEP endpoint then adjusts the TSK queue scheduling to ensure the throughput does not exceed the desired throughput.

The TSK FC Stop and FC Resume can be two separate messages based on, for example, the Command field in the TSK FC message. However, TSK Flow Control Increase/Decrease can be a single message, with the desired throughput in the Command field of TSK FC message. For example,
Command=0x00 represents a TSK FC Stop Message;
Command=0x0F represents a TSK FC Resume Message; and Any other Command value is TSK FC Increase/Decrease message, with the Command field's value encoded as the desired throughput.
throughput does not exceed the desired throughput.

The configuration discussed herein can be symmetric to PEP endpoints for a terminal 24 and an IPGW 52. However, a terminal PEP typically includes additional enhancement to support per TSK queue scheduling capability to adjust the TSK throughput on the inroute. Such an enhancement may be employed in the outroute direction, with the terminal PEP endpoint reporting the desired over-the-air throughput to an IPGW 52, and then the IPGW 52 ensures that the outroute throughput for that TSK connection does not exceed the desired throughput requested by the terminal 24.

These operations can be performed based on buffer occupancy of individual TSK connections. As discussed above, these operations can be performed by the controller 34, or by any other suitable type of processor and associated hardware and software. For example, a PEP endpoint (e.g., terminal 24) continuously measures simple average (SA), exponential moving average (EMA) and smoothed moving average (SMA) of LAN throughput for each spoofed connection, and determines the flow service rate as discussed above. Using the calculated flow service rate and the configured threshold for memory usage, the controller 34 can calculate the FC Increase Buffer Usage Threshold and FC Decrease Buffer Usage Threshold values are calculated as shown, for example, in FIG. 19, as follows:

FC Increase Buffer Usage Threshold=Increase Threshold*max(Flow Service Rate,Configured Flow Service Rate)*min(Configured Round Trip Time,LLRTT)

FC Decrease Buffer Usage Threshold=Decrease Threshold*max(Flow Service Rate,Configured Flow Service Rate)*min(Configured Round Trip Time,LLRTT)

Where,
Increase Threshold and Decrease Threshold are configured values for buffer usage threshold.
LLRTT is the Lightly Loaded RTT for the PBP connection.
Setting Configured Round Trip Time to a value closer/equal to transport delay (for ex: 600 ms) ensures that the LLRTT factor is not accounted in buffer threshold calculation.
Configured Flow Service Rate is the lower bound for the Flow Service Rate. This prevents the Buffer Usage Threshold from becoming zero value.

Figure 19:
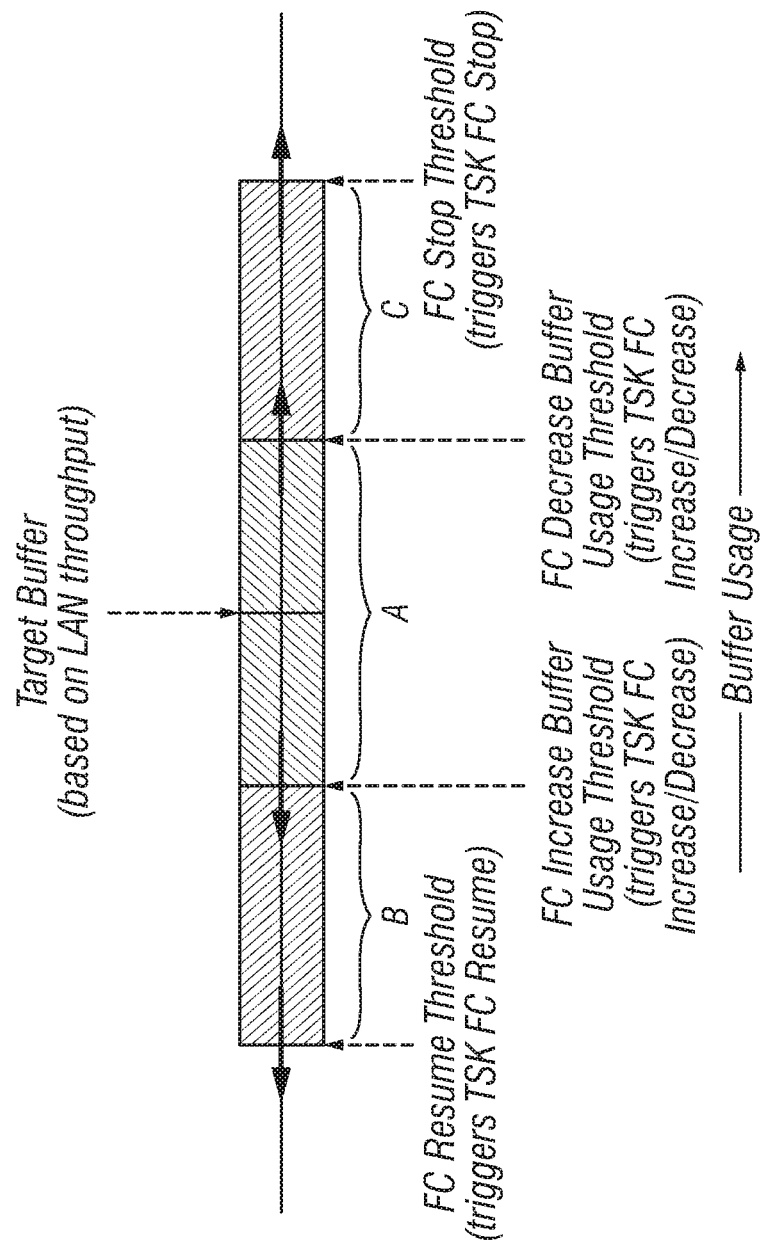
FIG. 19 conceptually illustrates buffer usage as monitored and controlled by the satellite communication network shown in FIGS. 1 and 2.

For each connection, the PEP endpoint (e.g., terminal 24) determines two threshold values for TSK FC increase/decrease and two threshold values for TSK FC stop/resume based on buffer occupancy and Flow Service Rate as discussed above. Also, in FIG. 19, area A indicates the ideal buffer occupancy for a given connection based on Flow Service Rate (LAN throughput), and areas B and C indicate the buffer overrun or underrun, compared to the ideal target buffer. The arrows indicate the transition from one buffer threshold to another, which triggers a TSK flow control message to be issued by, for example, the controller 34, as discussed herein.

When the current buffer usage for a flow exceeds the FC Decrease Buffer Usage Threshold, then the PEP endpoint (e.g., terminal 24) triggers a TSK FC Increase/Decrease message to the peer PEP endpoint (sender, such as IPGW 52) and specifies the desired throughput. If the buffers 40 are getting full, then LAN throughput (Flow Service Rate) is determined to be less than the WAN throughput (over-the-air throughput). Thus, desired throughput reported will be less than the WAN throughput, resulting in gradual decrease in buffer usage for this flow. Similarly, when the current buffer usage for a flow falls below the FC Increase Buffer Usage Threshold, then the PEP endpoint (terminal 24) triggers a TSK FC Increase/Decrease message to the peer PEP endpoint (IPGW 52) and specifies the desired throughput. This causes a gradual increase in buffer usage to the desired amount for this flow.

When the end host (e.g., an end user device 44) issues a TCP Zero-window, then the PEP endpoint immediately triggers a TSK FC Stop message if the flow is not already stopped, to the remote PEP endpoint. However, when the end host opens its TCP Receive Window, then the PEP endpoint (Terminal) triggers a TSK FC Increase/Decrease message if the current buffer usage is below "FC Increase Buffer Usage Threshold" and above "FC Resume Threshold," or a TSK FC Resume message if the current buffer usage is below "FC Resume Threshold."

For a long lived connection, if the end host keeps the TCP receive window closed for a short interval (for ex: a couple of seconds), then the flow service rate may not have decreased/changed by a significant percentage. Thus, when the end host opens the receive window, the peer PEP endpoint can start servicing at the flow service rate without significantly impacting the average throughput. On the other hand, if the end host keeps the TCP receive window closed for a long interval (e.g., tens of seconds or higher), then the flow service rate would have decreased/changed by a significant percentage. Thus, when the end host opens the receive window, the peer PEP endpoint ramps up the flow service rate gradually, which potentially impacts (decreases) the average throughput for that connection.

In addition, a Flow Control Increase/Decrease message contains the desired throughput at which the peer PEP endpoint (e.g., IPGW 52) is expected to service a specific TSK flow. To ensure backward compatibility, existing message format is not modified. Using the remaining bits of Command field in TSK FC message, the absolute throughput is represented. Representing relative throughput instead of absolute throughput may have advantages such as fewer bits usage, more granular representation of throughput and ability to support any throughput. However, the relative rate may require additional overhead of book-keeping current throughput for every connection at sending (IPGW 52) and may be receiving (terminal 24) TSK PEP endpoint.

In addition, TSK Flow Control Increase/Decrease message uses the higher nibble (higher 4 bits) of the Command field (in TSK FC message) to represent the scaling factor, and the lower nibble represents the value. An entire 8 bits of the Command field in this example represents the desired throughput (expected Service Rate) for a connection. When the higher order nibble is 0x1, then the lower order nibble (values 0x0 to 0xF) represent 1 Mbps (1000 Kbps) to 16 Mbps (16000 Kbps). Similarly, when higher order nibble is 0x2, the lower order nibble (values 0x0 to 0xF) represent 17 Mbps to 32 Mbps, and so on. A special case is when higher order nibble is 0x0. When higher order nibble is 0x0, then the lower order nibble values 0x0 and 0xF represent TSK Flow Control Stop and Flow Control Resume respectively. However, the lower order nibble values 0x1 to 0xE represent 100 kbps to 1400 kbps. With this modified message format specification, the PEP endpoint is able to specify any values between 100 Kbps to 1400 Kbps in steps of 100 Kbps, and 1 to 240 Mbps in steps of 1 Mbps in the TSK FC Increase/Decrease message. Also, with a higher nibble set to 0x0, the lower nibble values 0x0 and 0xF represent TSK Flow Control Stop and Resume respectively. This remains unchanged and ensures backward compatibility.

Furthermore, when performing the calculations, the controller 34 (or any other suitable processor) at the PEP endpoint rounds up the current Flow Service Rate at "FC Increase Buffer Usage Threshold" to the nearest rate that can be represented and rounds down the current Flow Service Rate at "FC Decrease Buffer Usage Threshold" to the nearest rate that can be represented. Table 1 below provides an illustrative example of a desired throughput calculation for various Flow Service Rates.

TABLE 1

Illustrative Example of Desired Throughput Calculation

| Flow Service Rate | Desired Throughput at FC Increase Buffer Usage Threshold (round up) | Desired Throughput at FC Decrease Buffer Usage Threshold (round down) |
| --- | --- | --- |
| 280 Kbps | 300 Kbps | 200 Kbps |
| 750 Kbps | 800 Kbps | 700 Kbps |
| 1450 Kbps | 2 Mbps (2000 Kbps) | 1 Mbps (1000 Kbps) |
| 2380 Kbps | 3 Mbps (3000 Kbps) | 2 Mbps (2000 Kbps) |

It should be further noted that in this example, the IPGW 52 schedules each TSK connection to not exceed the "desired throughput" indicated by the terminal 24 in the TSK FC Increase/Decrease message. In this example, IPGW TSK Queue scheduling is not periodic in nature. Thus, a configurable time interval can be defined during which the desired throughput is achieved. The IPGW 52 ensures that the scheduled rate is equal to, or lower than the throughput indicated by the terminal, during a configured interval. Because the IPGW 52 ensures the throughput does not exceed in the configured interval, the average throughput over a longer period (longer than the interval) may be less than the desired throughput due to the fact that all intervals may not have available bandwidth to schedule or may not have traffic to schedule or both. In addition, since the IPGW 52 performs TSK Queue scheduling and moves the packet to a multiplexed queue (CIR queue), the actual throughput received at the terminal may not match desired throughput during any given interval, when measured at the terminal 24. Moreover, because of the multiplexed queue at the IPGW 52, the TSK FC may have a slightly delayed response. That is, the packets that are queued at multiplexed queue may still be sent to the terminal 24 even if the terminal 24 issues a TSK FC Stop or Increase/Decrease message.

The following describes examples of messaging that may occur during operations of the embodiment described above for increasing and decreasing buffering. For example, when the IPGW 52 receives a TSK FC Resume Message after TSK FC Increase/Decrease message, the sending PEP endpoint (IPGW 52) starts sending at full speed (e.g., at the service plan rate) if a TSK FC Resume Message is received. If the IPGW 52 receives a TSK FC Stop Message after TSK FC Increase/Decrease message, the ending PEP endpoint (IPGW 52) stops TSK queue scheduling on receiving TSK FC Stop message from receiving PEP endpoint (terminal 24), until TSK FC Resume message or TSK FC Increase/Decrease message is received. If the IPGW 52 receives a receiving TSK FC Increase/Decrease message after TSK FC Stop or FC Resume message, then the sending PEP endpoint (IPGW 52) schedules TSK queue to meet the rate specified in the FC Increase/Decrease message. For TSK Queue Scheduling, the PEP endpoint (IPGW 52) uses the last known "desired throughput" from TSK FC Increase/Decrease message. If the last known "desired throughput" is not available, then the IPGW 52 schedules at maximum throughput possible. This ensures backward compatibility with PEP endpoints that do not support TSK Flow Control Increase/Decrease message.

In addition, configuration ensures that the TSK FC Stop threshold is larger than TSK FC Decrease threshold. Configuration also ensures that the TSK FC Resume threshold is smaller than TSK FC Increase threshold. With TSK Stop/Resume operation, the number of FC Stops and FC Resumes are matched. However, with TSK FC Increase/Decrease operation, the number of FC Stops and Resumes may not match since TSK Increase/Decrease would cause the traffic to flow, which may result in TSK FC Resume not being sent).

For the Increase/Decrease operation, a terminal 24 may be configured with the following features in this example:
 a. Parameter to enable/disable TSK Flow Control Increase/Decrease feature.
 b. TSK FC Increase Threshold—buffer occupancy to trigger TSK flow control increase/decrease message (must be larger than Resume Threshold).
 c. TSK FC Decrease Threshold—buffer occupancy to trigger TSK flow control increase/decrease message (must be smaller than Stop Threshold).
 d. Configured Round Trip Time—this is the over-the-air RTT to estimate buffer required for a given throughput (default 1000 ms).
 e. CeilFloor_Threshold_1—This is the amount by which the Floor or Ceiling values for Desired Throughput is calculated, when the Flow Service Rate is greater than 1000 Kbps. Default value is 100.
 f. CeilFloor_Threshold_2—This is the amount by which the Floor or Ceiling values for Desired Throughput is calculated, when the Flow Service Rate is less than or equal to 1000 Kbps. Default value is 100.

Likewise for the Increase/Decrease operation, an IPGW 52 may be configured with a TSK queue scheduling interval to service the flow at specified desired throughput. A default for such as TSK queue scheduling interval can be, for example, 5 seconds.

In addition, the controller 34 at the terminal 24 can capture the following statistics, aggregate of all IPv4 and IPv6 spoofed connections: Number of Terminal TSK FC Increase/Decrease messages Sent/Received. The controller 34 at the terminal 24 can also capture the following per TSK connection statistics (CCB stats):
 i. Last reported "Desired Throughput" sent in the FC Increase/Decrease message.
 ii. Number of TSK FC Increase/Decrease messages Sent.

In addition, the IPGW 52 captures the following statistics, aggregate of all spoofed connections, and per terminal 24: number of Terminal TSK FC Increase/Decrease messages Sent/Received. Furthermore, the IPGW 52 captures the below listed per TSK connection (CCB stats):
 i. Last reported "Desired Throughput" received in FC Increase/Decrease message.
 ii. Number of TSK FC Increase/Decrease messages Received.
 iii. Number of times the TSK throughput was lower (due to TSK FC Increase/Decrease message) than the Service Plan rate.
 iv. Theoretical Max Throughput with TSK Flow Control. For example, Assume, Total life time of connection is 100 sec and Service Plan Rate of 10 Mbps. If FC Increase/Decrease was used to limit the throughput (lower than the Service plan rate) to 5 Mbps for 10 sec, 2 Mbps for 20 sec, 1 Mbps for 30 sec, 500 Kbps for 10 secs and 10 secs of FC Stop, then the Time-Average of Flow Controlled Throughput is (5 Mbps*10 sec+2 Mbps*20 sec+1 Mbps*30 sec+0.5 Mbps*10 sec+0 Mbps*10+10 Mbps*(100−10−20−30−10−10)sec)/100 sec=3.25 Mbps. This provides the theoretical maximum throughput that could have been achieved with TSK Flow Control. (Also, this calculation is not done at the terminal 24 since the terminal 24 is not aware of the Service Plan Rate).

Thus, the operations performed by the embodiments described herein provide optimal buffer usage (e.g., optimal usage of buffer 40 at a terminal 24) for each flow based on the flow service rate, in a shared buffer system to ensure that a slow draining flow does not monopolize the buffer 34 and that a fast draining connection can reach the SLA throughput. The embodiments also provide a mechanism to provide optimal buffer usage without impacting the flow service rate (throughput) in a proxy environment where the proxy (local and remote) endpoints buffer the traffic. Hence, one or more slow draining application (e.g., an end user device 44 in poor WiFi conditions, or an application whose inherent nature causes slow draining) does not monopolize the shared buffer space. This optimized buffer usage increases the number of connections that can be supported and also the maximum throughput that may be achieved.

The embodiments described herein can be employed in, for example, the Jupiter satellite system deployed by Hughes Network Systems, or in any other suitable satellite communication system or other type of communication system as understood in the art. The embodiments are generally applicable to Proxy Server Environments and flow control mechanisms in Transport Level protocols such as TCP or other suitable protocols.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A data buffering control system for a communication network, the data buffering control system comprising:
    a buffer comprising a memory disposed at a destination site and configured to buffer data received at a data receiving rate by the destination site for delivery by the destination site to a user at a delivery flow rate;
    an electronic controller comprising a processor configured to control a buffering rate according to which the data is buffered in the buffer based on an amount of buffered data in the buffer without stopping the buffering of the data in the buffer; and
    a transmitter configured to transmit the buffered data,
    the controller being configured to increase the data receiving rate in response to the controller determining that the amount of the buffered data in the buffer is below a lower threshold amount, and the controller being configured to decrease the data receiving rate in response to the controller determining that the amount of the buffered data in the buffer is above an upper threshold amount,
    the buffer being further configured to buffer additional data received at an additional data receiving rate by the destination site,
    the controller being configured to control an additional buffering rate according to which the additional data is buffered in the buffer based on the amount of the buffered data in the buffer without stopping the buffering of the additional data in the buffer, and
    the buffering rate and the additional buffering rate being different from each other.

2. The data buffering control system according to claim 1, wherein
    the controller is configured to control the data receiving rate by the destination site to modify the buffering rate without stopping receipt of the data at the destination site.

3. The data buffering control system according to claim 1, wherein
    the controller is configured to perform a transmission control protocol spoofing process at the destination site to effect a communication handshaking operation, without the destination site communicating with a source providing the data, to control the data receiving rate by the destination site to modify the buffering rate.

4. The data buffering control system according to claim 1, further comprising
    a communication device disposed at the destination site and configured to communicate with the communication network that includes a satellite-based communication network; and
    the controller controls the communication device to communicate, via the satellite-based communication network, with a source that provides the data to the destination site.

5. A data buffering control system for a communication network, the data buffering control system comprising:
    a buffer comprising a memory disposed at a destination site and configured to buffer data received at a data receiving rate by the destination site for delivery by the destination site to a user at a delivery flow rate;
    an electronic controller comprising a processor configured to perform a transmission control protocol spoofing process at the destination site to effect a communication handshaking operation, without the destination site communicating with a source providing the data, to control the data receiving rate by the destination site to modify a buffering rate according to which the data is buffered in the buffer based on an amount of buffered data without stopping receipt of the data at the destination site; and
    a transmitter configured to transmit the buffered data,
    the controller being configured to perform the transmission control protocol spoofing process to increase the data receiving rate in response to the controller determining that the amount of the buffered data in the buffer is below a lower threshold amount, and the controller being configured to perform the transmission control protocol spoofing process to decrease the data receiving rate in response to the controller determining that the amount of the buffered data in the buffer is above an upper threshold amount,
    the buffer being further configured to buffer additional data received at an additional data receiving rate by the destination site,
    the controller being configured to perform the transmission control protocol spoofing process at the destination site to effect another communication handshaking operation, without the destination site communicating with a source providing the additional data, to control an additional data receiving rate by the destination site to modify an additional buffering rate according to which the additional data is buffered in the buffer based on the amount of buffered data without stopping receipt of the additional data at the destination site, and
    the buffering rate and the additional buffering rate being different from each other.

6. The data buffering control system according to claim 5, further comprising
    a communication device disposed at the destination site and configured to communicate with the communication network that includes a satellite-based communication network; and
    the controller controls the communication device to communicate, via the satellite-based communication network, with the source that provides the data to the destination site.

7. A data buffering control method for a communication network, the data buffering control method comprising:
    operating an electronic controller to evaluate an amount of buffered data in a buffer that is disposed at a destination site and configured to buffer data received at a data receiving rate by the destination site for delivery by the destination site to a user at a delivery flow rate;

operating the controller to control a buffering rate according to which the data is buffered in the buffer based on the amount of buffered data in the buffer without stopping the buffering of the data in the buffer;

operating the controller to control the buffer to buffer additional data received at an additional data receiving rate by the destination site;

operating the controller to control an additional buffering rate according to which the additional data is buffered in the buffer based on the amount of the buffered data in the buffer without stopping the buffering of the additional data in the buffer; and transmitting, via a transmitter, the buffered data, the operating of the controller to control the data receiving rate includes operating the controller to increase the data receiving rate in response to the controller determining that the amount of the buffered data in the buffer is below a lower threshold amount, and operating the controller to decrease the data receiving rate in response to the controller determining that the amount of the buffered data in the buffer is above an upper threshold amount, the buffering rate and the additional buffering rate being different from each other.

8. The data buffering control method according to claim 7, wherein the operating of the controller to control the buffering rate includes operating the controller to control the data receiving rate by the destination site to modify the buffering rate without stopping receipt of the data at the destination site.

9. The data buffering control method according to claim 7, further comprising operating the controller to perform a transmission control protocol spoofing process at the destination site to effect a communication handshaking operation, without the destination site communicating with a source providing the data, to control the data receiving rate by the destination site to modify the buffering rate.

10. The data buffering control method according to claim 7, further comprising operating the controller to control a communication device disposed at the destination site to communicate with the communication network that includes a satellite-based communication network; and operating the controller to control the communication device to communicate, via the satellite-based communication network, with a source that provides the data to the destination site.

11. The data buffering control method according to claim 7, wherein the operating the controller to control a buffering rate includes determining a relative increase or decrease in the buffering rate with respect to a current buffering rate, and adjusting the buffering rate in accordance with that relative increase or decrease.

\* \* \* \* \*